US007777967B2

(12) United States Patent
Hirakawa

(10) Patent No.: US 7,777,967 B2
(45) Date of Patent: Aug. 17, 2010

(54) ZOOM LENS, CAMERA DEVICE AND PERSONAL DIGITAL ASSISTANT

(75) Inventor: Makoto Hirakawa, Hiratsuka (JP)

(73) Assignee: Ricoh Company, Ltd., Tokyo (JP)

( * ) Notice: Subject to any disclaimer, the term of this patent is extended or adjusted under 35 U.S.C. 154(b) by 364 days.

(21) Appl. No.: 12/027,628

(22) Filed: Feb. 7, 2008

(65) Prior Publication Data
US 2010/0073778 A1   Mar. 25, 2010

(30) Foreign Application Priority Data
Feb. 8, 2007 (JP) ............................. 2007-029731

(51) Int. Cl.
G02B 15/14 (2006.01)
(52) U.S. Cl. ........................ 359/684; 359/680; 359/683; 359/685; 359/686; 359/715; 359/740; 359/781
(58) Field of Classification Search ......... 359/680–686, 359/715, 740, 781
See application file for complete search history.

(56) References Cited

U.S. PATENT DOCUMENTS

| | | | | |
|---|---|---|---|---|
| 4,653,873 | A | | 3/1987 | Kawamura |
| 5,000,550 | A | * | 3/1991 | Takahashi et al. ............ 359/680 |
| 5,585,970 | A | * | 12/1996 | Shibayama ................. 359/686 |
| 5,663,835 | A | * | 9/1997 | Shibayama ................. 359/684 |
| 5,774,267 | A | * | 6/1998 | Kodama et al. ............. 359/684 |
| 5,835,272 | A | * | 11/1998 | Kodama ..................... 359/684 |
| 6,320,698 | B1 | * | 11/2001 | Suzuki ........................ 359/686 |
| 6,618,198 | B1 | * | 9/2003 | Endo ........................... 359/686 |
| 6,639,721 | B2 | * | 10/2003 | Endo ........................... 359/686 |
| 6,804,064 | B2 | | 10/2004 | Hirakawa |
| 6,829,102 | B2 | | 12/2004 | Ohashi et al. |
| 7,075,730 | B2 | * | 7/2006 | Nishimura .................. 359/686 |
| 7,079,326 | B2 | | 7/2006 | Hirakawa |
| 7,106,520 | B2 | * | 9/2006 | Saori .......................... 359/681 |
| 7,508,592 | B2 | * | 3/2009 | Harada ....................... 359/680 |
| 2004/0130801 | A1 | * | 7/2004 | Mihara ....................... 359/680 |
| 2007/0002417 | A1 | | 1/2007 | Hirakawa et al. |
| 2007/0030538 | A1 | | 2/2007 | Hirakawa et al. |
| 2007/0215800 | A1 | | 9/2007 | Miyatake et al. |

FOREIGN PATENT DOCUMENTS

| | | |
|---|---|---|
| JP | 60-87312 | 5/1985 |
| JP | 2-48088 | 10/1990 |
| JP | 2001-183585 | 7/2001 |
| JP | 3466385 | 8/2003 |

* cited by examiner

Primary Examiner—Evelyn A. Lester
(74) Attorney, Agent, or Firm—Oblon, Spivak, McClelland, Maier & Neustadt, L.L.P.

(57) ABSTRACT

A zoom lens including, in order from an object side to an image side, a first group having a negative focal length, a second group having a positive focal length, a third group having a negative focal length, a fourth group having a positive focal length, and an aperture stop between the second group and the third group, wherein when changing a magnification from a short focus end to a long focus end, at least the second group monotonically moves from the image side to the object side such that a distance between the first group and the second group decreases, and a distance between the second group and the third group increases, and the third group includes a three-cemented lens having a negative lens, a positive lens and a negative lens in order from the object side.

20 Claims, 18 Drawing Sheets

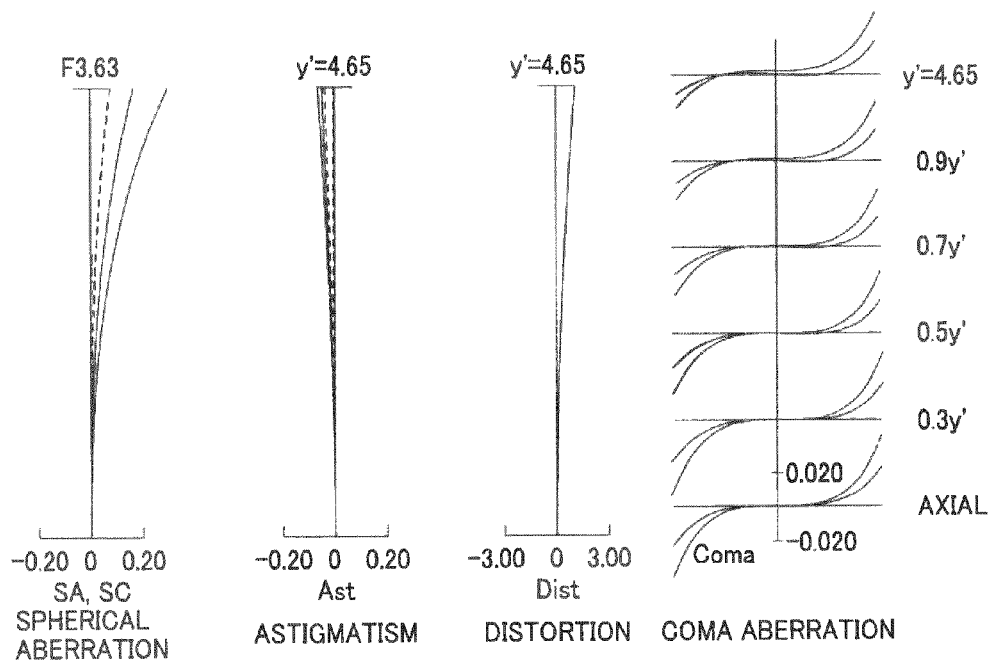
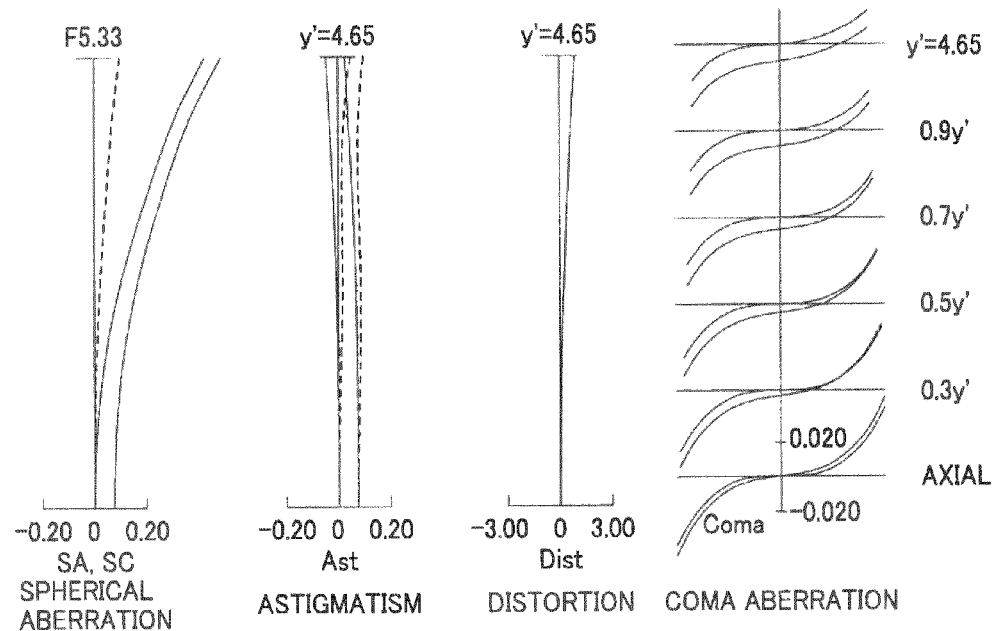

US 7,777,967 B2

ZOOM LENS, CAMERA DEVICE AND PERSONAL DIGITAL ASSISTANT

PRIORITY CLAIM

The present application is based on and claims priority from Japanese Patent Application No. 2007-029731, filed on Feb. 8, 2007, the disclosure of which is hereby incorporated by reference in their entirety.

BACKGROUND OF THE INVENTION

1. Field of the Invention

The present invention relates to a zoom lens, a camera device and a personal digital assistant.

2. Description of the Related Art

Along with the increased popularity of digital cameras, users demand relative to a digital camera not only a high-quality image and a reduced size, but also a photographing lens having a high magnification ratio. As the high magnification ratio of the zoom lens for use as the photographing lens, 4 times or more is demanded. In addition, a user also demands a photographing lens having a wide angle of view. As a half angle of view at the wide angle end of the zoom lens for use as the photographing lens, 35 degrees or more is demanded.

Conventionally, a zoom lens described in each of JP S60-87312A, JP H02-48088A and JP2001-183585A has been known as a zoom lens in which four groups having a negative focal length, a positive focal length, a negative focal length and a positive focal length are arranged from an object side. However, each of the zoom lenses has a magnification ratio of about 3 times, so it can not meet the recent demand regarding a magnification ratio of a zoom lens for a digital camera.

In addition, generally, in a zoom lens for a digital camera, an exit pupil position is limited severer than that for a silver salt camera because a CCD is used as an imaging element. For this reason, it is necessary for the exit pupil position to have about −20 mm to −100 mm in the whole zooming area. The compensation of the exit pupil position in the group nearest to the image side is especially, important. Since the fluctuation of the exit pupil position increases as the magnification ratio increases, the need for the above compensation further increases.

SUMMARY OF THE INVENTION

The present invention has been made in view of the above circumstances. An object of the present invention is to provide a downsized and lightweight new zoom lens having a half angle of view of 35 degrees or more at the short focus end, a magnification ratio of about 4 to 5 times or more, a resolving power equivalent to an imaging element having 3 to 5 million pixels, and a high performance for a changing magnification area. The zoom lens also can dispose an exit pupil position in an appropriate position, and has a small number of lenses.

Also, another object of the present invention is to provide a camera device having the above zoom lens as a photographing optical system and a personal digital assistant having the above zoom lens as a photographing optical system of a camera functioning part.

A first aspect of the present invention relates to a zoom lens, including, in order from an object side to an image side, a first group having a negative focal length, a second group having a positive focal length, a third group having a negative focal length, a fourth group having a positive focal length, and an aperture stop between the second group and the third group, wherein when changing a magnification from a short focus end to a long focus end, at least the second group monotonically moves from the image side to the object side such that a distance between the first group and the second group decreases, and a distance between the second group and the third group increases, and the third group includes a three-cemented lens having a negative lens, a positive lens and a negative lens in order from the object side.

Preferably, an F-number $Fno_T$ at the long focus end, a focal length $f_W$ at the short focus end, a maximum image height $Y_{max}$ satisfy the condition $4.5 < Fno_T \cdot f_W / Y_{max} < 8.0$.

Preferably, a surface nearest to the object side in the three-cemented lens of the third group includes an aspherical surface.

Preferably, a reflective index $N_{C2}$ and an Abbe's number $v_{C2}$ of the positive lens disposed in the middle of the three-cemented lens of the third group satisfy the conditions $1.45 < N_{C2} < 1.65$ and $50 < v_{C2} < 85$.

Preferably, a reflective index $N_{C3}$ and an Abbe's number $v_{C3}$ of the negative lens nearest to the image side in the three-cemented lens of the third group satisfy the conditions $1.45 < N_{C3} < 1.65$ and $v_{C2} - v_{C3} > 20$.

Preferably, a curvature radius $R_{C2}$ of a cemented surface of the object side in the three-cemented lens of the third group and a curvature radius $R_{C4}$ of a surface nearest to the image side in the three-cemented lens of the third group satisfy the condition $0.20 < (R_{C2}/R_{C4}) < 0.85$.

A second aspect of the present invention relates to a zoom lens including, in order from an object side to an image side, a first group having a negative focal length, a second group having a positive focal length, a third group having a negative focal length, a fourth group having a positive focal length, and an aperture stop between the second group and the third group, wherein when changing a magnification from a short focus end to a long focus end, a distance between each of the groups is changed such that a distance between the first group and the second group decreases, a distance between the second group and the third group increases, and a distance between the third group and the fourth group increases, the first group includes a negative meniscus lens having a convex surface on the object side, a negative lens, and a positive lens in order from the object side, and a focal length $F_1$ of the first group, a focal length $F_w$ of an entire system at the short focus end, a distance $D_{3T}$ between the third group and the fourth group at the long focus end, and a distance $D_{3W}$ between the third group and the fourth group at the short focus end satisfy the conditions $1.7 < |F_1/F_w| < 2.2$ and $1.3 < D_{3T}/D_{3W} < 1.7$.

Preferably, an F-number $Fno_T$ at the long focus end, a focal length $f_W$ at the short focus end, and a maximum image height $Y_{max}$ satisfy the condition $4.5 < Fno_T \cdot f_W / Y_{max} < 8.0$.

Preferably, an average value $N_{1P}$ of refractive indexes and an average value $v_{1P}$ of Abbe's numbers in the positive lens of the first group, and an average value $N_{1N}$ of refractive indexes and an average value $v_{1N}$ of Abbe's numbers in the negative lens of the first group satisfy the conditions $1.74 < N_{1P} < 1.95$, $1.74 < N_{1N} < 1.95$, and $v_{1N} - v_{1P} > 20$.

Preferably, a curvature radius $R_{C3}$ and a maximum image height $Y_{max}$ of the cemented surface in the cemented lens of the third group satisfy the condition $1.0 < |R_{C3}/Y_{max}| < 3.0$.

Preferably, focusing is conducted by the fourth group.

Preferably, a focal length $f_1$ of the first group and a focal length $f_4$ of the fourth group satisfy the condition $1.5 < |f_4/f_1| < 3.0$.

A third aspect of the present invention relates to a zoom lens, including, in order from an object side to an image side, a first group having a negative focal length, a second group having a positive focal length, a third group having a negative focal length, a fourth group having a positive focal length, and an aperture stop between the second group and the third group, wherein when changing a magnification from a short focus end to a long focus end, a distance between each of the groups is changed such that a distance between the first group and the second group decreases, a distance between the second group and the third group increases, and a distance between the third group and the fourth group increases, the second group includes at least one plastic aspherical surface lens, and a focal length $F_1$ of the first group, a focal length $F_W$ of an entire system at the short focus end, a distance $D_{3T}$ between the third group and the fourth group at the long focus end, and a distance $D_{3W}$ between the third group and the fourth group at the short focus end satisfy the conditions $1.7<|F_1/F_W|<2.2$ and $1.3<D_{3T}/D_{3W}<1.7$.

Preferably, an F-number $Fno_T$ at the long focus end, a focal length $f_W$ at the short focus end, a maximum image height $Y_{max}$ satisfy the condition $4.5<Fno_T \cdot f_W/Y_{max}<8.0$.

Preferably, the zoom lens further includes at least one plastic aspherical surface lens having positive power and at least one plastic aspherical surface lens having negative power.

Preferably, an average value $N_{1P}$ of refractive indexes and an average value $v_{1P}$ of Abbe's numbers in the positive lens of first group, and an average value $N_{1N}$ of refractive indexes and an average value $v_{1N}$ of Abbe's numbers in the negative lens of the first group satisfy the conditions $1.74<N_{1P}<1.95$ and $v_{1N}-v_{1P}>20$.

Preferably, the third group includes a negative lens, a positive lens and a negative lens in order from the object side, and the positive lens and the negative lens on the image side thereof are cemented.

Preferably, a curvature radius $R_{C3}$ and a maximum image height $Y_{max}$ of the cemented surface in the cemented lens of the third group satisfy the condition $1.0<|R_{C3}/Y_{max}|<3.0$.

A fourth aspect of the present invention relates to a camera device including the zoom lens as a photographing optical system.

A fifth aspect of the present invention relates to a personal digital assistant including the zoom lens as a photographing optical system of a camera functioning part.

BRIEF DESCRIPTION OF THE DRAWINGS

These and other features, aspects, and advantages of the present invention will become better understood with regard to the following description, appended claims, and accompanying drawings.

FIG. 7 is a view illustrating aberrations at an intermediate focal length of the zoom lens according to the second embodiment.

FIG. 8 is a view illustrating aberrations at a long focus end of the zoom lens according to the second embodiment.

DETAILED DESCRIPTION OF THE PREFERRED EMBODIMENTS

Figure 1:
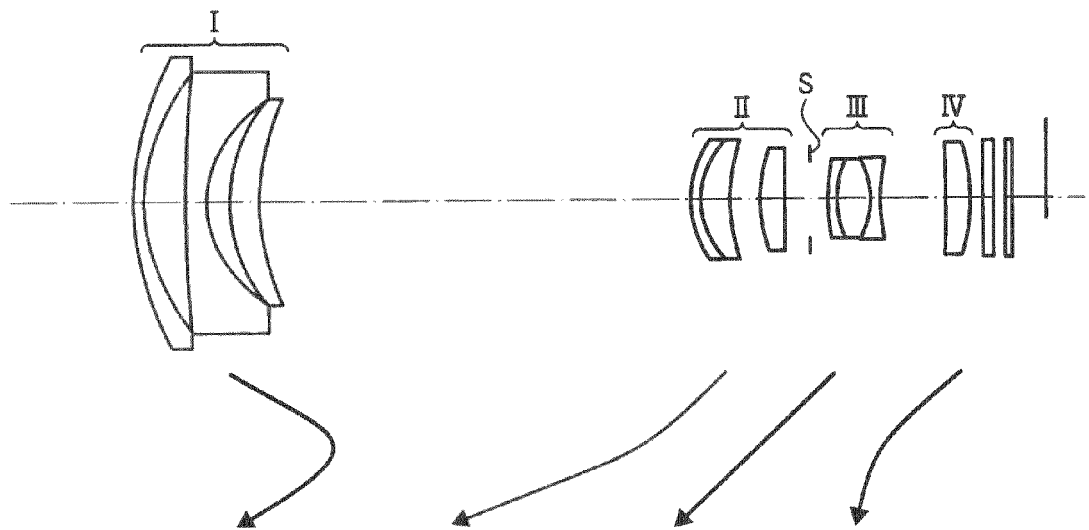
FIG. 1 is a view illustrating a lens structure and displacement of each group of a zoom lens according to a first embodiment.
Figure 2:
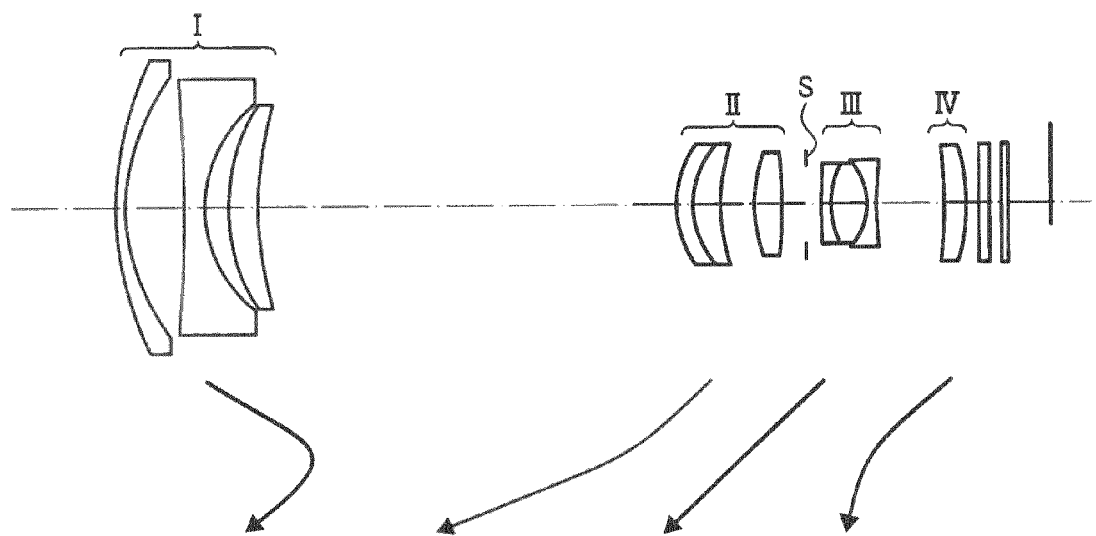
FIG. 2 is a view illustrating a lens structure and displacement of each group of a zoom lens according to a second embodiment.

FIG. 1 illustrates a zoom lens according to an after-mentioned first embodiment. FIG. 2 illustrates a zoom lens according to an after-mentioned second embodiment.

The zoom lens illustrated in each of FIGS. 1, 2 includes, in order from an object side (left side in the view), a first group I having a negative focal length, a second group II having a positive focal length, a third group III having a negative focal length, a fourth group IV having a positive focal length, and an aperture stop S between the second group and the third group. As illustrated by the arrows, in the zoom lens illustrated in each of FIGS. 1, 2, when changing a magnification from the short focus end to the long focus end, at least the second group II monotonically moves from the image side to the object side such that a distance between the first group I and the second group II decreases, and a distance between the second group II and the third group III increases. The third group includes a cemented lens (three-cemented lens) having a negative lens, a positive lens and a negative lens in order from the object side.

Moreover, as described in the after-mentioned first and second embodiments, in the zoom lens illustrated in each of FIGS. 1, 2, an F-number $Fno_T$ at the long focus end, a focal length $f_w$ at the short focus end, and a maximum image height $Y_{max}$ satisfy the following condition.

$$4.5 < Fno_T \cdot f_W / Y_{max} < 8.0 \quad (1)$$

Furthermore, the negative lens nearest to the object side in the three-cemented lens of the third group III includes a meniscus shape having a convex surface on the object side. As illustrated in each of the first and second embodiments, the surface nearest to the object side in the three-cemented lens of the third group is an aspherical surface. The third group consists of the three-cemented lens, and the aperture stop S moves integrally with the aperture stop S.

As illustrated in each of the first and second embodiments, a refractive index $N_{C2}$ and an Abbe's number $v_{C2}$ of the positive lens disposed in the middle of the three-cemented lens of the third group III satisfy the following conditions, respectively.

$$1.45 < N_{C2} < 1.65 \quad (2)$$

$$50 < v_{C2} < 85 \quad (3)$$

A refractive index $N_{C3}$ and an Abbe's number $V_{C3}$ of the negative lens nearest to the image side in the three-cemented lens of the third group III satisfy the following conditions, respectively.

$$1.45 < N_{C3} < 1.65 \quad (4)$$

$$v_{C2} - v_{C3} > 20 \quad (5)$$

Moreover, a curvature radius $R_{C2}$ of the cemented surface on the object side in the three-cemented lens of the third group and a curvature radius $R_{C4}$ of the surface nearest to the image side in the three-cemented lens satisfy the following condition.

$$0.20 < (R_{C2}/R_{C4}) < 0.85 \quad (6)$$

Figure 9:
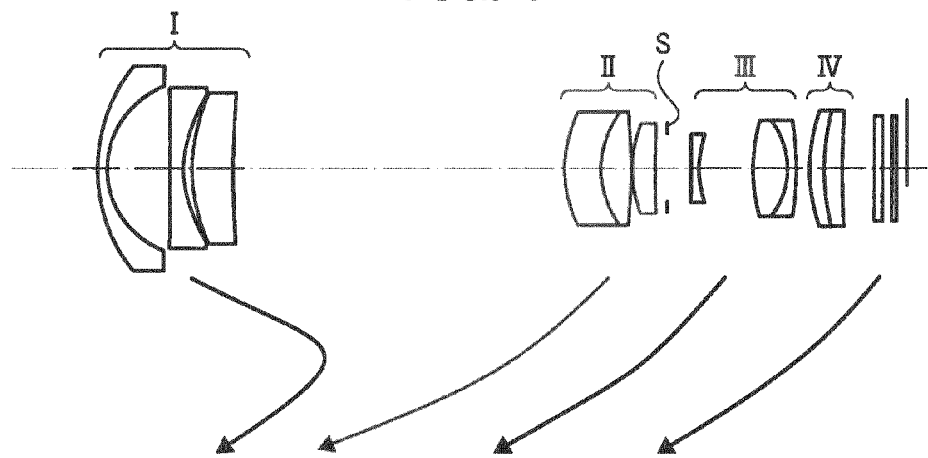
FIG. 9 is a view illustrating a lens structure and displacement of each group of a zoom lens according to a third embodiment.
Figure 10:
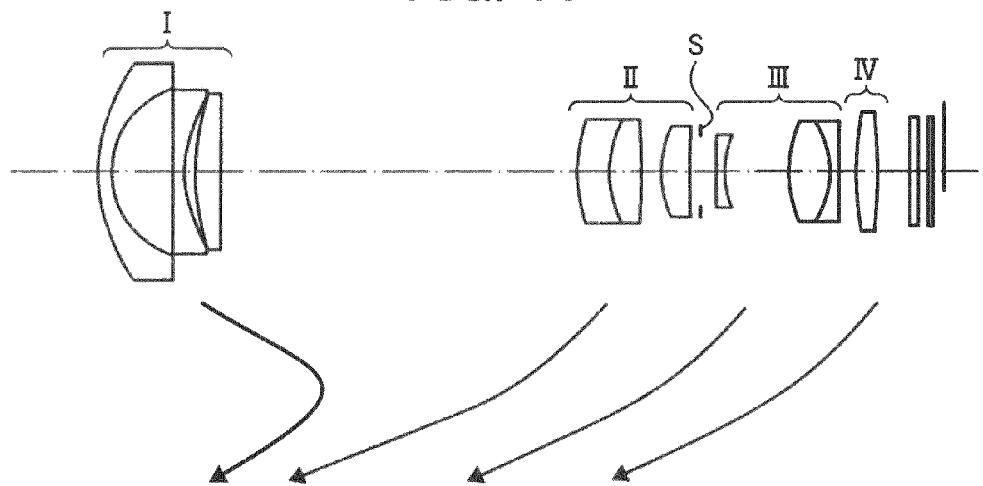
FIG. 10 is a view illustrating a lens structure and displacement of each group of a zoom lens according to a fourth embodiment.
Figure 11:
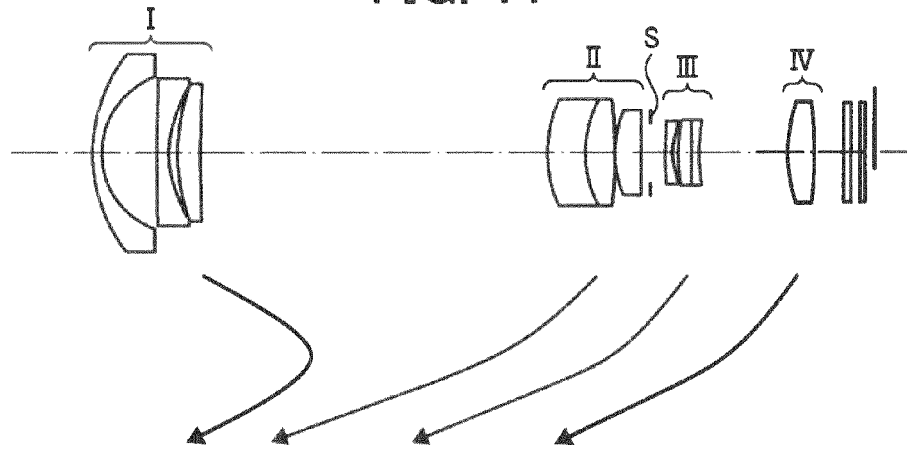
FIG. 11 is a view illustrating a lens structure and displacement of each group of a zoom lens according to a fifth embodiment.

The zoom lens illustrated in each of FIGS. 9-11 includes, in order from an object side (left side in each view), a first group I having a negative focal length, a second group II having a positive focal length, a third group III having a negative focal length, a fourth group IV having a positive focal length, and an aperture stop S between the second group and the third group. As illustrated by the arrows, in the zoom lens illustrated in each of FIGS. 9-11, when changing a magnification from the short focus end to the long focus end, a distance between each of the lenses is changed such that a distance between the first group I and the second group II decreases, a distance between the second group II and the third group III increases, and a distance between the third group III and the fourth group IV increases. The first group I includes a negative meniscus lens having a concave surface on the object side, a negative lens and a positive lens from the object side.

The zoom lenses illustrated in FIGS. 9-11 are zoom lenses described in after-mentioned third to fifth embodiments, respectively. As illustrated in each of the embodiments, a focal length $F_I$ of the first group I, a focal length $F_w$ of an entire system at the short focus end, a distance $D_{3T}$ between the third group III and the fourth group IV at the long focus end, and a distance $D_{3W}$ between the third group III and the fourth group IV at the short focus end satisfy the following conditions.

$$1.7 < |F_I/F_w| < 2.2 \quad (7)$$

$$1.3 < D_{3T}/D_{3W} < 1.7 \quad (8)$$

In addition, an F-number $Fno_T$ at the long focus end, a focal length $f_W$ at the short focus end, and a maximum image height $Y_{max}$ satisfy the following condition.

$$4.5 < Fno_T \cdot f_W / Y_{max} < 8.0 \quad (9)$$

An average value $N_{1P}$ of refractive indexes and an average value $v_{1P}$ of Abbe's numbers of the positive lens in the first group I, and an average value $N_{1N}$ of refractive indexes and an average value $v_{1N}$ of Abbe's numbers of the negative lens in the first group I satisfy the following conditions.

$$1.74 < N_{1P} < 1.95 \quad (10)$$

$$1.74 < N_{1N} < 1.95 \quad (11)$$

$$v_{1N} - v_{1P} > 20 \quad (12)$$

The aperture stop S moves integrally with the third group III when changing a magnification. As illustrated in the third to fifth embodiments, at least the surface nearest to the object side in the third group III is an aspherical surface.

The third group III has a negative lens, a positive lens and a negative lens in order from the object side, and the positive lens and the negative lens on the image side thereof are cemented.

As illustrated in the third to fifth embodiments, a curvature radius $R_{C3}$ and a maximum image height $Y_{max}$ of the cemented surface in the cemented lens of the third group III satisfy the following condition.

$$1.0 < |R_{C3}/Y_{max}| < 3.0 \quad (13)$$

In addition, a focal length $f_1$ of the first group I and a focal length $f_4$ of the fourth group IV satisfy the following condition.

$$1.5 < |f_4/f_1| < 3.0 \quad (14)$$

The focusing is conducted by the fourth group.

Figure 21:
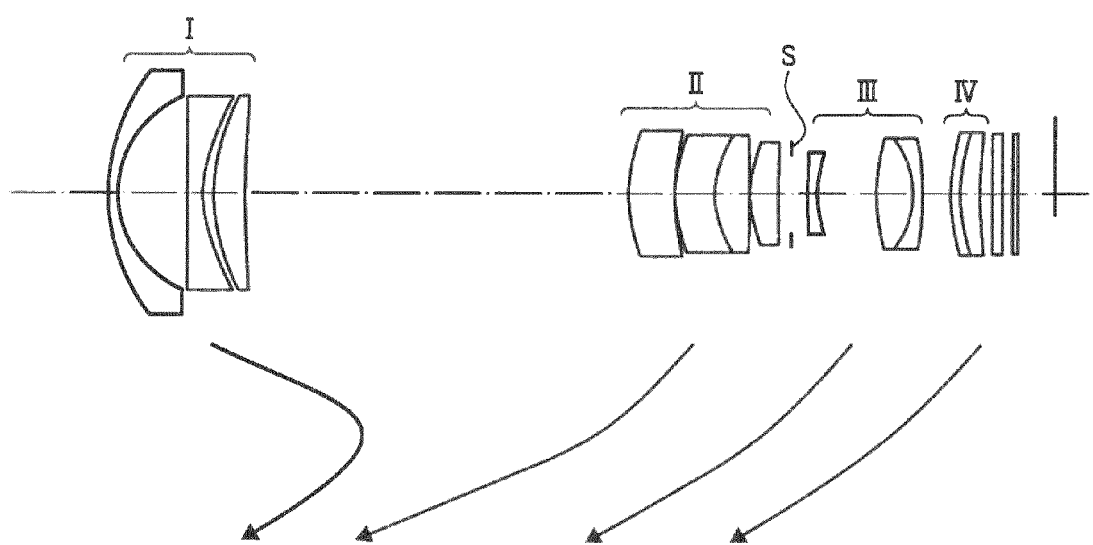
FIG. 21 is a view illustrating a lens structure and displacement of each group of a zoom lens according to a sixth embodiment.
Figure 22:
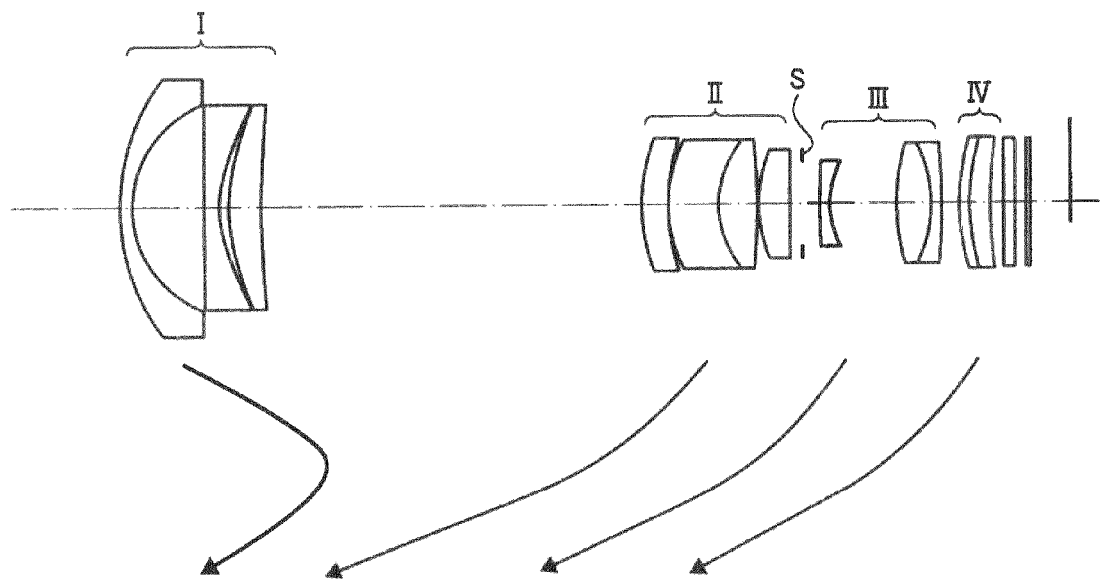
FIG. 22 is a view illustrating a lens structure and displacement of each group of a zoom lens according to a seventh embodiment.
Figure 23:
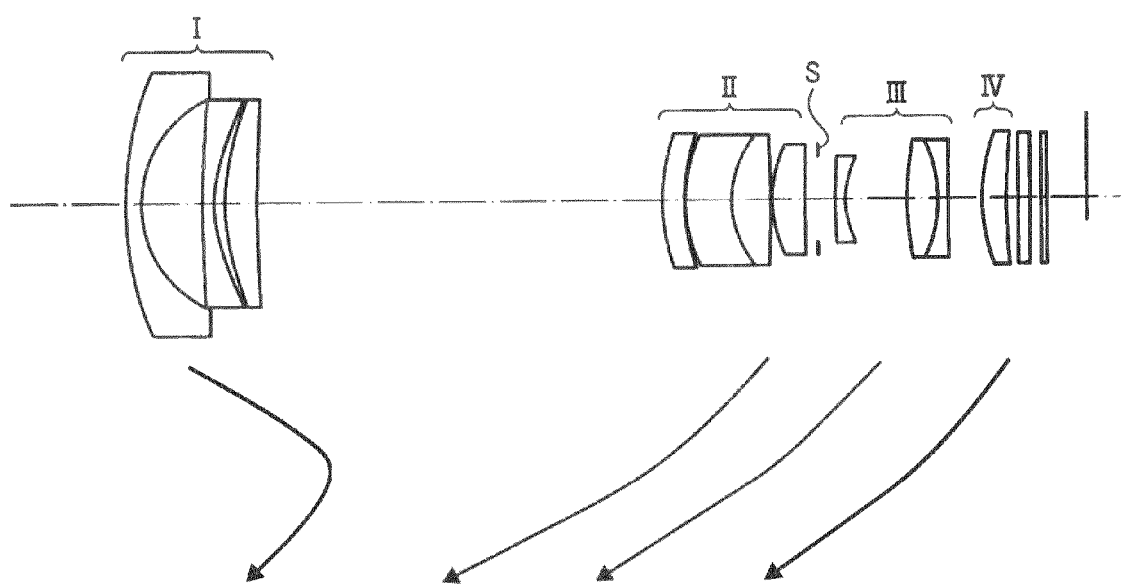
FIG. 23 is a view illustrating a lens structure and displacement of each group of a zoom lens according to an eighth embodiment.

The zoom lenses illustrated in FIGS. 21-23 illustrate zoom lenses described in after-mentioned sixth to eighth embodiments, respectively.

More particularly, the zoom lens illustrated in each of FIGS. 21-23 includes, in order from an object side, a first group I having a negative focal length, a second group II having a positive focal length, a third group III having a negative focal length, a fourth group IV having a positive focal length, and an aperture stop S between the second group II and the third group III. As illustrated by the arrows, in the zoom lens, when changing a magnification from the short focus end to the long focus end, a distance between each of the groups is changed such that a distance between the first group I and the second group I decreases, a distance between the second group II and the third group III increases, and a distance between the third group III and the fourth group IV increases.

As illustrated in each of after-mentioned sixth to eighth embodiments, the second lens group II includes at least one plastic aspherical surface lens, and a focal length $F_1$ of the first group I, a focal length $F_w$ of the entire system at the short focus end, a distance $D_{3T}$ between the third group III and the fourth group IV at the long focus end, and a distance $D_{3W}$ between the third group III and the fourth group IV at the short focus end satisfy the following condition.

$$1.7 < |F_1/F_w| < 2.2 \quad (15)$$

$$1.3 < D_{3T}/D_{3W} < 1.7. \quad (16)$$

As illustrated in each of the sixth to eighth embodiments, an F-number $Fno_T$ at the long focus end, a focal length $f_w$ at the short focus end, and a maximum image height $Y_{max}$ satisfy the following condition.

$$4.5 < F_{noT}/Y_{max} < 8.0 \quad (17)$$

The zoom lens illustrated in each of the sixth to eighth embodiments includes at least one plastic aspherical surface lens having positive power and one plastic aspherical surface lens having negative power. Each of the plastic aspherical surface lenses is made of a material different to each other.

As illustrated in each of the sixth and eighth embodiments, an average value $N_{IP}$ of refractive indexes and an average value $v_{1P}$ of Abbe's numbers of the positive lens in the first group I, and an average value $N_{1N}$ of refractive indexes and an average value $v_{1N}$ of Abbe's numbers of the negative lens in the first group I satisfy the following conditions.

$$1.74 < N_{1P} < 1.95 \quad (18)$$

$$v_{1N} - v_{1P} > 20 \quad (19)$$

In the zoom lens illustrated in each of the sixth to eight embodiments, the aperture stop S moves integrally with the third group when changing a magnification, at least the surface nearest to the object side in the third group includes an aspherical surface, the third group III includes a negative lens, a positive lens and a negative lens in order from the object side, and in the third group III, the positive lens and the negative lens on the image side thereof are cemented.

As illustrated in the sixth to eighth embodiments, a curvature radius $R_{C3}$ and a maximum image height $Y_{max}$ of the cemented surface of the cemented lens in the third group III satisfy the following condition.

$$1.0 < |R_{C3}/Y_{max}| < 3.0. \quad (20)$$

Figure 33A:
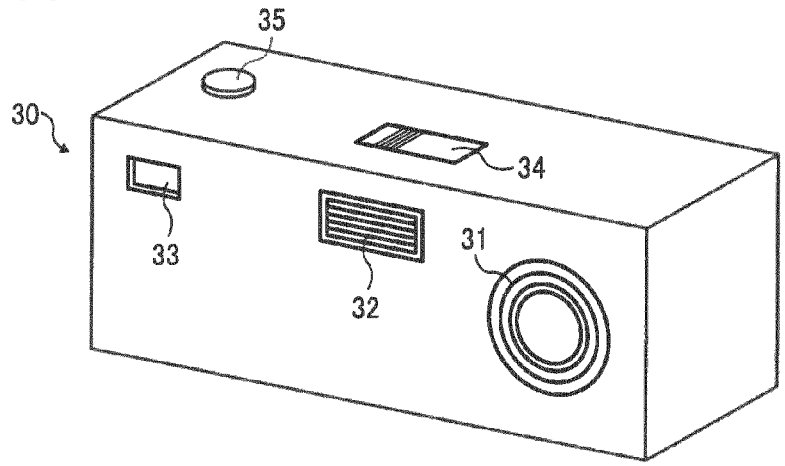
FIG. 33 is a view illustrating a personal digital assistant according to an embodiment 1.
Figure 33B:
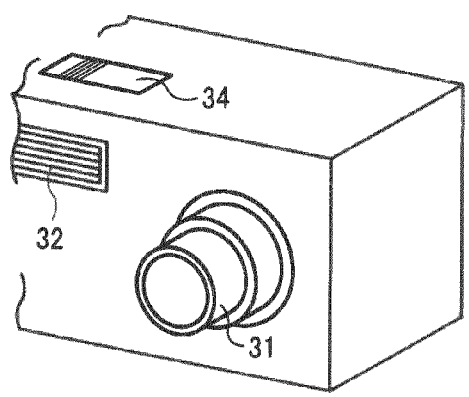
Figure 33C:
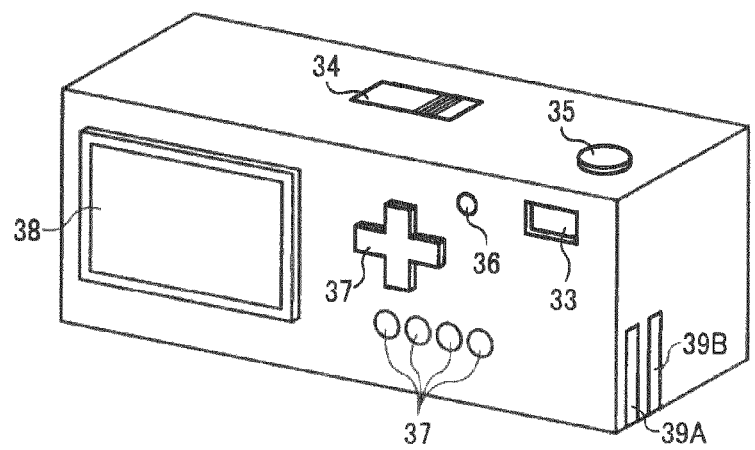
Figure 34:
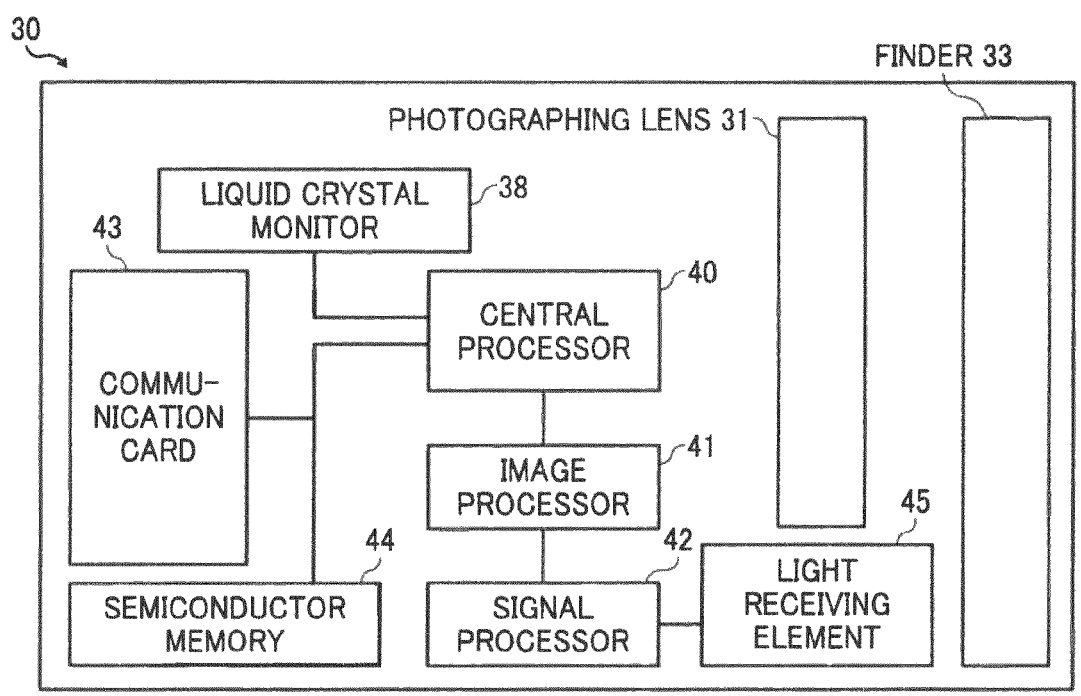
FIG. 34 is a view describing a system of the personal digital assistance.

Referring to FIGS. 33, 34, an embodiment 1 of a personal digital assistant will be described.

As illustrated in FIGS. 33A, 33B, 33C, 34, a personal digital assistant 30 includes a photographing lens 31 and a light receiving element (area sensor) 45 of an imaging element. In the personal digital assistant 30, an image of a photographing object by the photographing lens 31 is imaged onto the light receiving element 45, so as to be read by the light receiving element 45. The light receiving element 45 is a color imaging element.

More particularly, for example, any of the zoom lenses described in the after-mentioned first to eighth embodiments is used as the photographing lens 31. In addition, for example, a CCD area sensor having 3 million to 5 million pixels can be used as the light receiving element 45.

As illustrated in FIG. 34, the output from the light receiving element 45 is processed by a signal processor 42 which receives the control of a central processor 40, so as to be converted into digital information. The image information digitized by the signal processor 42 is recorded in a semiconductor memory 44 after receiving a predetermined image process in the image processor 41 which receives the control of the central processor 40. A liquid crystal monitor 38 can display an image in photographing and also can display an image recorded in the semiconductor memory 44. In addition, the image recorded in the semiconductor memory 44 can be sent to an external device by means of a communication card 43, for example.

As illustrated in FIG. 33A, when the personal digital assistant is carried, the photographing lens 31 is in a collapsed state. When a user operates a power source switch 36 to turn on the personal digital assistant, a lens barrel is extended out as illustrated in FIG. 33B. In this case, each of the groups of the zoom lenses inside the lens barrel is arranged at the short focus end, for example. The arrangement of each group is changed by operating a zoom lever 34, and a magnification can be changed to the long focus end. In this case, a magnification of a finder 33 is changed in conjugation with the change in the angle of view of the photographing lens 31.

The focusing is conducted by half-pressing a shutter button 35. The focusing is conducted by the movement of the fourth group or the movement of the light receiving element 45. If the shutter button 35 is further pressed, the photographing is conducted. After that, the above-described image information process is conducted. Reference number 32 denotes a flash.

When displaying the image recorded in the semiconductor memory 4 onto the liquid crystal monitor 38 or sending the image to an external device by means of the communication card or the like, an operation button 37 is used. The semiconductor memory 44, the communication card 43 and the like are used by inserting into dedicated slots or generalized slots 39A, 39B.

Moreover, when the photographing lens 31 is in the collapsed state, it is not always necessary for each group of the zoom lens to be arranged on the optical axis. For example, if the third lens group, the fourth lens group and the fifth lens group are retracted from the optical axis to be housed in parallel with the other lens groups, the thickness of the portable digital assistant can be further reduced. In the zoom lens according to the present invention, as described above, since the thickness of the first lens group and the thickness of the second lens group are reduced, the housing method of retracting the lens groups after the aperture stop from the optical axis is effective for further reducing the thickness of the personal digital assistant.

Furthermore, the communication function by means of the communication card or the like in the personal digital assistant illustrated in FIGS. 33A, 33B, 33C, 34 can be omitted, so that the personal digital assistant can be used as a camera device.

Embodiments

Hereinafter specific embodiments regarding the zoom lens will be described. Symbols in each of the embodiments are as follows.
f: focal length of entire system
F: F-number
ω: half-angle of view
R: curvature radius
D: distance between surfaces
$N_d$: refractive index
$v_d$: Abbe's number
K: conical constant of aspherical surface
A4: fourth order aspherical surface coefficient
A6: sixth order aspherical surface coefficient
A8: eighth order aspherical surface coefficient
A10: tenth order aspherical surface coefficient In this case, the aspherical surface in each of the following embodiments is given by the following known formula.

$$X=CH^2/\{1+\sqrt{(1-(1+K)C^2H^2)}\}+A4\cdot H^4+A6\cdot H^6+A8\cdot H^8+A10\cdot H^{10}$$

Here, C is an inverse number of paraxial curvature radius (paraxial curvature), H is the height from the optical axis, K is the above-described conical constant, and A4 is the above-described fourth order aspherical surface coefficient. The shape of the aspherical surface is specified by giving the values of C, K, A4, etc.

First Embodiment, Refer to FIG. 1 f=5.95 to 28.13, F=2.75 to 5.29, ω=39.24 to 9.35
The data of the first embodiment is presented in Table 1.

TABLE 1

| Surface Number | R | D | $N_d$ | $v_d$ | Remarks | |
|---|---|---|---|---|---|---|
| 01 | 24.779 | 0.80 | 1.83500 | 42.98 | First Lens | First Group |
| 02* | 13.013 | 3.40 | | | | |
| 03 | 100.000 | 1.73 | 1.62041 | 60.34 | Second Lens | |
| 04* | 9.473 | 1.95 | | | | |
| 05 | 12.694 | 2.47 | 1.84666 | 23.78 | Third Lens | |
| 06 | 18.593 | Variable A | | | | |
| 07* | 8.750 | 0.80 | 1.62004 | 36.30 | Fourth Lens | Second Group |
| 08 | 6.720 | 2.35 | 1.48749 | 70.44 | Fifth Lens | |
| 09 | 13.967 | 2.55 | | | | |
| 10* | 12.197 | 2.09 | 1.62041 | 60.34 | Sixth Lens | |
| 11 | −142.027 | Variable B | | | | |
| 12 | Aperture | 1.50 | | | | |
| 13* | 18.572 | 0.80 | 1.83500 | 42.98 | Seventh Lens | Third Group |
| 14 | 7.734 | 2.78 | 1.58913 | 61.25 | Eighth Lens | |
| 15 | −6.689 | 0.80 | 1.62004 | 36.30 | Ninth Lens | |
| 16 | 14.174 | Variable C | | | | |
| 17* | −75.072 | 1.95 | 1.67270 | 32.17 | Tenth Lens | Fourth Group |
| 18 | −16.609 | Variable D | | | | |
| 19 | ∞ | 0.93 | 1.54892 | 69.31 | Various Filters | |
| 20 | ∞ | 0.80 | | | | |
| 21 | ∞ | 0.50 | 1.50000 | 64.00 | | |
| 22 | ∞ | | | | | |

[Aspherical Surface]
The data of the aspherical surface (the surface in which * is marked in the surface number in the table 1) is presented in Table 2.

TABLE 2

| | Surface Number | | | | | |
|---|---|---|---|---|---|---|
| | 2 | 4 | 7 | 10 | 13 | 17 |
| K | 0.0 | 0.0 | 0.0 | 0.0 | 0.0 | 0.0 |
| A4 | −1.19825E−04 | 1.62950E−04 | 2.09467E−07 | −1.08516E−04 | −1.39935E−04 | −1.07757E−05 |
| A6 | 1.75500E−08 | −1.18779E−06 | −2.59753E−07 | −1.31812E−06 | −1.37458E−06 | 5.32861E−07 |
| A8 | −3.45320E−09 | 3.19782E−08 | 6.77804E−09 | −4.13717E−09 | 6.56647E−08 | −1.88959E−08 |
| A10 | 4.02769E−11 | −6.44569E−10 | −3.17072E−11 | −5.04264E−10 | −1.62508E−09 | 2.51967E−10 |
| A12 | −1.28628E−13 | | | | | |

[Valuable Amount]

The data of the variable amount is presented in Table 3.

TABLE 3

|   | Short Focus End | Intermediate Focal Length | Long Focus End |
|---|---|---|---|
| f | 5.95 | 12.90 | 28.06 |
| A | 35.32 | 11.02 | 3.08 |
| B | 2.00 | 3.33 | 8.64 |
| C | 4.80 | 2.75 | 17.74 |
| D | 2.90 | 11.30 | 13.73 |

[Value of Parameter of Conditions]

$Fno_T \cdot f_w / Y_{max} = 6.77$
$N_{C2} = 1.58913$
$v_{C2} = 61.25$
$N_{C3} = 1.62004$
$v_{C2} - v_{C3} = 24.95$
$(R_{C2}/R_{C4}) = 0.55$ Second Embodiment, Refer to FIG. 2 f=5.98 to 28.11, F=2.77 to 5.33, ω=39.05 to 9.31
The data of the second embodiment is presented in Table 4.

TABLE 4

| Surface Number | R | D | $N_d$ | $v_d$ | Remarks | |
|---|---|---|---|---|---|---|
| 01 | 26.295 | 0.80 | 1.83500 | 42.98 | First Lens | First Group |
| 02* | 13.278 | 4.65 | | | | |
| 03 | −101.975 | 1.76 | 1.62041 | 60.34 | Second Lens | |
| 04* | 11.365 | 1.92 | | | | |
| 05 | 15.664 | 2.28 | 1.84666 | 23.78 | Third Lens | |
| 06 | 26.960 | Variable A | | | | |
| 07* | 8.631 | 1.25 | 1.62004 | 36.30 | Fourth Lens | Second Group |
| 08 | 6.844 | 2.23 | 1.48749 | 70.44 | Fifth Lens | |
| 09 | 13.778 | 2.79 | | | | |
| 10* | 11.679 | 2.21 | 1.62041 | 60.34 | Sixth Lens | |
| 11 | −68.086 | Variable B | | | | |
| 12 | 0.000 | 1.20 | | | | |
| 13* | 54.706 | 0.80 | 1.83500 | 42.98 | Seventh Lens | Third Group |
| 14 | 7.217 | 2.90 | 1.60311 | 60.69 | Eighth Lens | |
| 15 | −4.994 | 0.80 | 1.62004 | 36.30 | Ninth Lens | |
| 16 | 32.430 | Variable C | | | Tenth Lens | Fourth Group |
| 17* | −46.368 | 1.72 | 1.84666 | 23.78 | Eleventh Lens | |
| 18 | −17.828 | Variable D | | | | |
| 19 | ∞ | 0.93 | 1.54892 | 69.31 | Various Filters | |
| 20 | ∞ | 0.80 | | | | |
| 21 | ∞ | 0.50 | 1.50000 | 64.00 | | |
| 22 | ∞ | | | | | |

[Aspherical Surface]

The data of the aspherical surface is presented in Table 5.

TABLE 5

| | Surface Number | | | | | |
|---|---|---|---|---|---|---|
| | 2 | 4 | 7 | 10 | 13 | 17 |
| K | 0.0 | 0.0 | 0.0 | 0.0 | 0.0 | 0.0 |
| A4 | −1.05096E−04 | 1.58008E−04 | −2.10795E−05 | −1.23362E−04 | −1.58521E−04 | −1.72387E−05 |
| A6 | −8.55125E−08 | −4.30492E−07 | −4.22243E−07 | −1.29390E−06 | −1.15517E−06 | 4.01376E−07 |
| A8 | −4.29449E−09 | 1.33889E−08 | 8.21290E−10 | −2.37575E−09 | 1.35463E−07 | −1.52468E−08 |
| A10 | 3.51150E−11 | −1.91542E−10 | −7.39595E−11 | −4.44832E−10 | −4.96443E−09 | 2.23354E−10 |
| A12 | −1.28629E−13 | | | | | |

[Valuable Amount]

The data of the valuable amount is presented in Table 6.

TABLE 6

|   | Short Focus End | Intermediate Focal Length | Long Focus End |
|---|---|---|---|
| f | 5.98 | 13.03 | 28.11 |
| A | 33.68 | 10.02 | 2.00 |
| B | 2.00 | 3.26 | 7.55 |
| C | 5.39 | 3.38 | 18.62 |
| D | 3.50 | 11.50 | 12.92 |

[Value of Parameter of Conditions]

Figure 3:
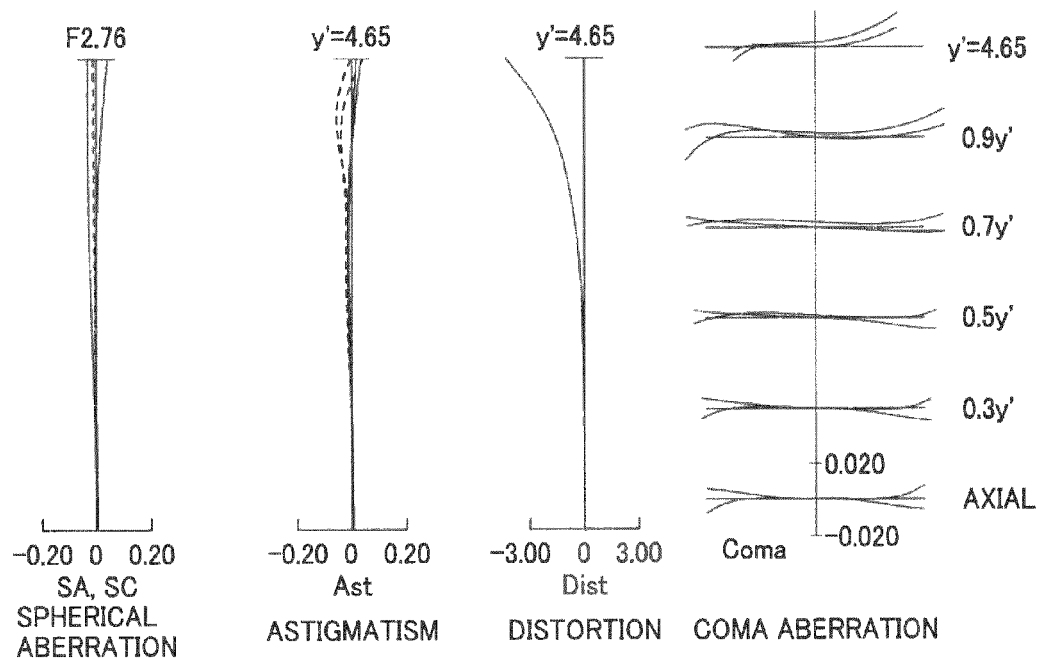
FIG. 3 is a view illustrating aberrations at a short focus end of the zoom lens according to the first embodiment.
Figure 4:
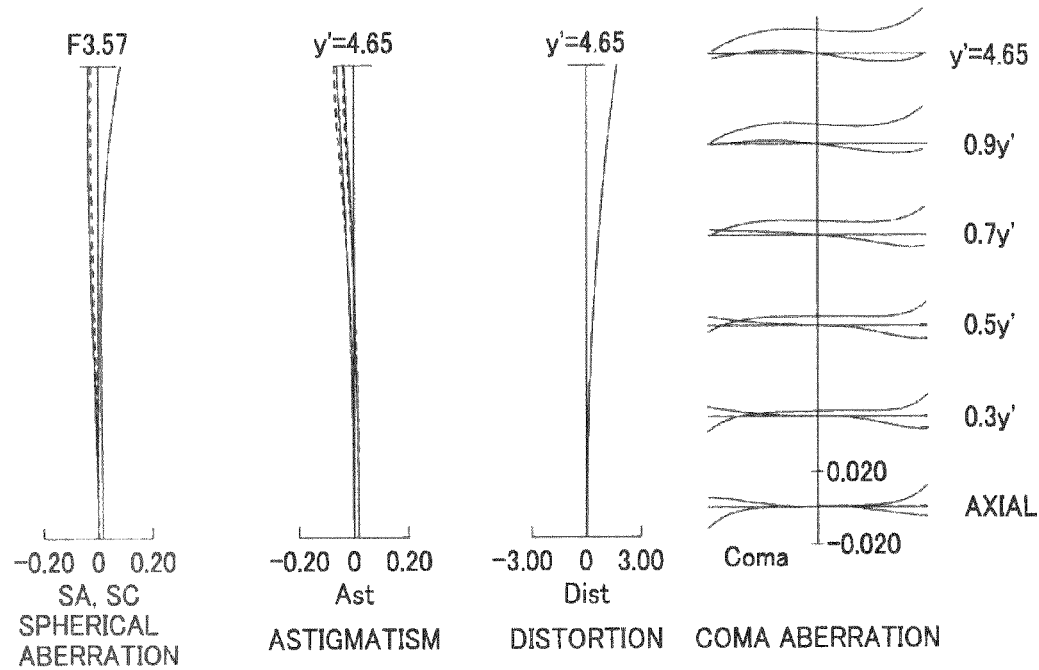
FIG. 4 is a view illustrating aberrations at an intermediate focal length of the zoom lens according to the first embodiment.
Figure 5:
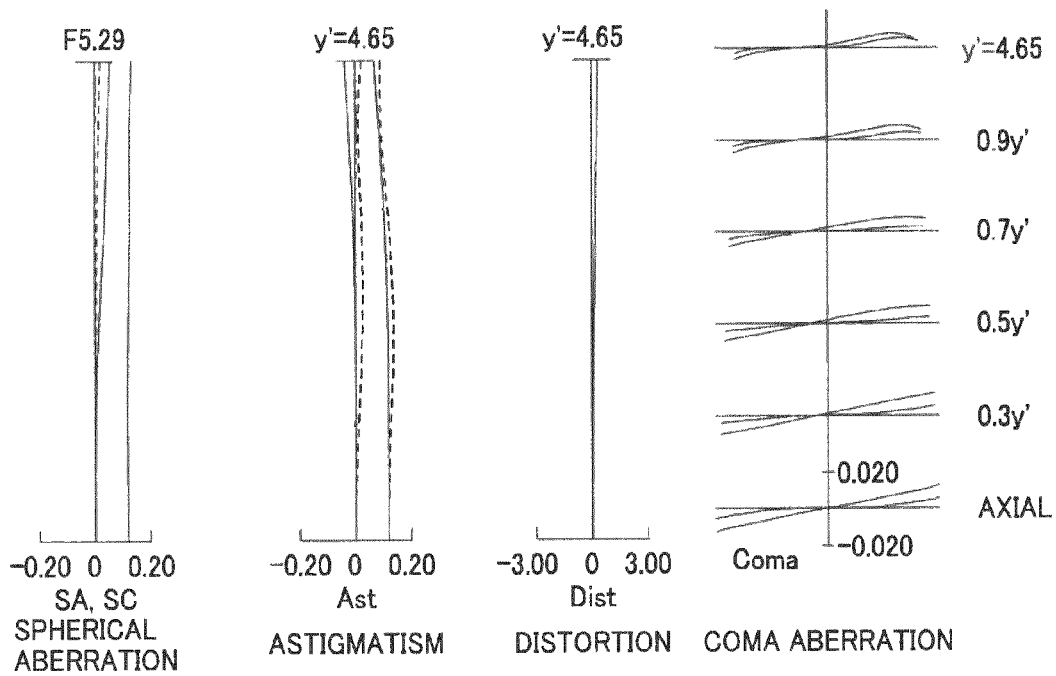
FIG. 5 is a view illustrating aberrations at a long focus end of the zoom lens according to the first embodiment.
Figure 6:
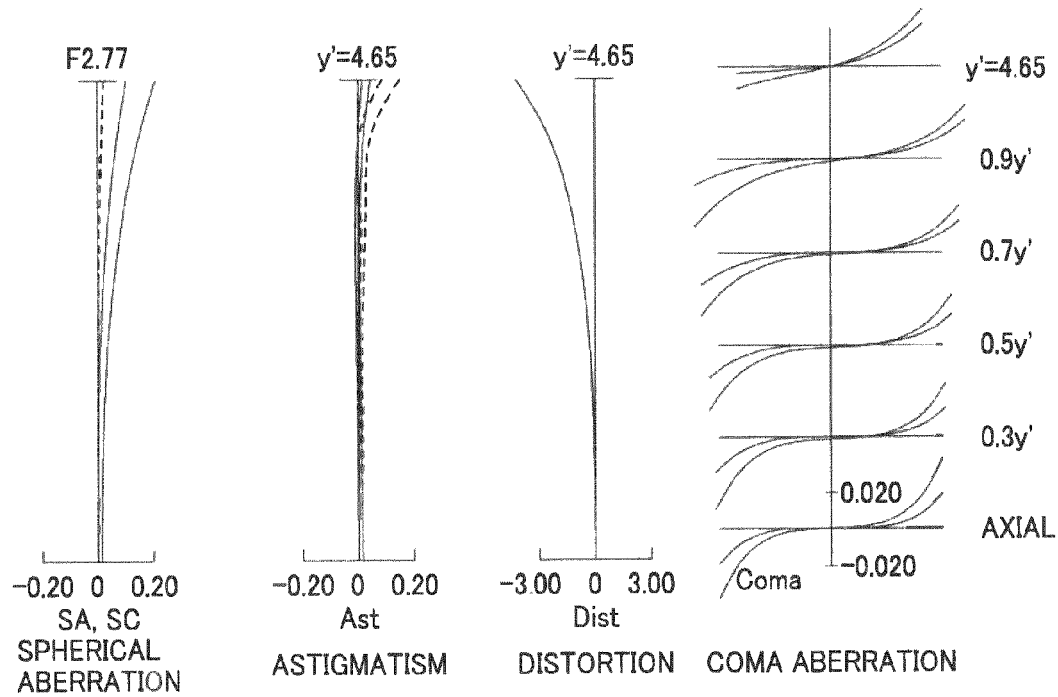
FIG. 6 is a view illustrating aberrations at a short focus end of the zoom lens according to the second embodiment.

$Fno_T / f_W / Y_{max} = 6.86$
$N_{C2} = 1.60311$
$v_{C2} = 60.69$
$N_{C3} = 1.62004$
$v_{C2} - v_{C3} = 24.39$
$(R_{C2}/R_{C4}) = 0.22$ FIGS. 3, 4, 5 illustrate aberration views at the short focus end, the intermediate focal length, and the long focus end regarding the first embodiment, respectively. FIGS. 6, 7, 8 illustrate aberration views at the short focus end, the intermediate focal length, and the long focus end regarding the second embodiment, respectively. The dashed line in each of the spherical aberration views denotes a sine condition. The solid line and the dashed line in each of the astigmatism views denote sagittal and meridional conditions, respectively. These are similar to the aberration views in the following embodiments.

Third Embodiment, Refer to FIG. 9 f=5.95 to 28.09, F=2.93 to 5.14, ω=39.26 to 9.62
The data of the third embodiment is presented in Table 7.

TABLE 7

| Surface Number | R | D | $N_d$ | $v_d$ | Remarks | |
|---|---|---|---|---|---|---|
| 01 | 15.381 | 0.98 | 1.83500 | 42.98 | First Lens | First Group |
| 02 | 8.430 | 5.86 | | | | |
| 03* | −343.182 | 1.26 | 1.77250 | 49.62 | Second Lens | |
| 04* | 10.060 | 0.81 | | | | |
| 05 | 16.785 | 4.00 | 1.84666 | 23.78 | Third Lens | |
| 06 | 101.924 | Variable A | | | | |
| 07 | 12.095 | 3.49 | 1.72825 | 28.32 | Fourth Lens | Second Group |
| 08 | 8.247 | 3.00 | 1.48749 | 70.44 | Fifth Lens | |
| 09 | −80.507 | 0.18 | | | | |
| 10* | 11.178 | 2.23 | 1.58913 | 61.25 | Sixth Lens | |
| 11 | 93.061 | Variable B | | | | |
| 12 | Aperture | 2.27 | | | | |
| 13* | 500.000 | 0.80 | 1.60700 | 27.00 | Seventh Lens | Third Group |
| 14 | 9.355 | 5.26 | | | | |
| 15 | 18.493 | 3.25 | 1.51680 | 64.20 | Eighth Lens | |
| 16 | −7.018 | 0.80 | 1.83500 | 42.98 | Ninth Lens | |
| 17 | −38.189 | Variable C | | | | |
| 18 | 17.292 | 1.35 | 1.48749 | 70.44 | Tenth Lens | Fourth Group |
| 19 | 21.364 | 1.72 | 1.84666 | 23.78 | Eleventh Lens | |
| 20 | 120.421 | Variable D | | | | |
| 21 | ∞ | 0.93 | 1.54892 | 69.31 | Various Filters | |
| 22 | ∞ | 0.80 | | | | |
| 23 | ∞ | 0.50 | 1.50000 | 64.00 | | |
| 24 | ∞ | | | | | |

[Aspherical Surface]
The data of the aspherical surface is presented in Table 8.

TABLE 8

| Surface Number | K | A4 | A6 | A8 | A10 |
|---|---|---|---|---|---|
| 3 | 0.0 | 5.77285E−06 | 1.43266E−07 | −7.41079E−10 | −6.62589E−12 |
| 4 | 0.0 | −1.90875E−04 | −1.09110E−06 | 3.73807E−09 | −2.32102E−10 |
| 10 | 0.0 | −7.78777E−05 | −5.66150E−07 | −6.41683E−09 | −2.97960E−12 |
| 13 | 0.0 | 3.68142E−05 | 7.08556E−07 | −8.60640E−09 | 2.25241E−09 |

[Valuable Amount]
The data of the valuable amount is presented in Table 9.

TABLE 9

| | Short Focus End f = 5.95 | Intermediate Focal Length f = 12.89 | Long Focus End f = 28.09 |
|---|---|---|---|
| A | 31.85 | 10.90 | 1.20 |
| B | 1.13 | 2.99 | 8.06 |
| C | 1.28 | 1.20 | 1.91 |
| D | 3.08 | 10.28 | 23.57 |

[Value of Parameter of Conditions]
$|F_1/F_W|=1.99$
$D3_T/D3_W=1.49$
$Fno_T \cdot f_W/Y_{max}=6.58$ $N_{1P}=1.847$
$N_{1N}=1.804$
$v_{1N}-v_{1P}=22.52$
$|R_{C3}/Y_{max}|=1.51$
$|f_4/f_1|=2.22$ Fourth Embodiment, Refer to FIG. 10 f=5.95 to 28.09, F=2.90 to 5.33, ω=39.23 to 9.55
The data of the fourth embodiment is presented in Table 10.

TABLE 10

| Surface Number | R | D | $N_d$ | $v_d$ | Remarks | |
|---|---|---|---|---|---|---|
| 01 | 16.332 | 1.31 | 1.77250 | 49.62 | First Lens | First Group |
| 02 | 8.311 | 5.55 | | | | |
| 03* | 975.319 | 1.08 | 1.77250 | 49.62 | Second Lens | |
| 04* | 10.293 | 1.04 | | | | |
| 05 | 22.119 | 2.35 | 1.84666 | 23.78 | Third Lens | |
| 06 | 399.235 | Variable A | | | | |
| 07 | 13.558 | 3.12 | 1.72825 | 28.32 | Fourth Lens | Second Group |
| 08 | 10.304 | 3.00 | 1.48749 | 70.44 | Fifth Lens | |
| 09 | −95.784 | 1.90 | | | | |
| 10* | 10.029 | 2.69 | 1.58913 | 61.25 | Sixth Lens | |
| 11 | 89.866 | Variable B | | | | |
| 12 | Aperture | 1.50 | | | | |
| 13* | 500.000 | 0.80 | 1.60700 | 27.00 | Seventh Lens | Third Group |
| 14 | 8.505 | 6.05 | | | | |
| 15 | 11.333 | 3.82 | 1.51680 | 64.20 | Eighth Lens | |
| 16 | −8.099 | 0.80 | 1.83400 | 37.34 | Ninth Lens | |
| 17 | 258.976 | Variable C | | | | |
| 18* | 37.005 | 1.92 | 1.84666 | 23.78 | Tenth Lens | Fourth Group |
| 19 | −50.029 | Variable D | | | | |
| 20 | ∞ | 0.93 | 1.54892 | 69.31 | Various Filters | |
| 21 | ∞ | 0.80 | | | | |
| 22 | ∞ | 0.50 | 1.50000 | 64.00 | | |
| 23 | ∞ | | | | | |

[Aspherical Surface]
The data of the aspherical surface is presented in Table 11.

[Value of Parameter of Conditions]
$|F_1/F_W|=1.99$

TABLE 11

| Surface Number | K | A4 | A6 | A8 | A10 |
|---|---|---|---|---|---|
| 3 | 0.0 | −3.25588E−05 | −3.09028E−07 | 2.24626E−08 | −1.69239E−10 |
| 4 | 0.0 | −2.22719E−04 | −2.65814E−06 | 6.13052E−08 | −7.11590E−10 |
| 10 | 0.0 | −5.67844E−05 | −1.14558E−06 | 1.38465E−09 | −1.05783E−10 |
| 13 | 0.0 | −5.63408E−05 | 3.52892E−06 | −1.01261E−07 | 2.88418E−09 |
| 18 | 0.0 | −1.67335E−05 | −3.17407E−07 | 1.85817E−08 | −2.09279E−10 |

[Valuable Amount]
The data of valuable amount is presented in Table 12.

TABLE 12

| | Short Focus End f = 5.95 | Intermediate Focal Length f = 12.90 | Long Focus End f = 28.09 |
|---|---|---|---|
| A | 33.41 | 11.37 | 1.03 |
| B | 1.00 | 2.26 | 5.97 |
| C | 1.64 | 1.61 | 2.63 |
| D | 3.09 | 11.78 | 28.21 |

$D3_T/D3_W=1.60$
$Fno_T \cdot f_W/Y_{max}=6.83$
$N_{1P}=1.847$
$N_{1N}=1.773$
$v_{1P}-v_{1N}=25.84$
$|R_{C3}/Y_{max}|=1.74$
$|f_4/f_1|=2.14$ Fifth Embodiment, Refer to FIG. 11 f=5.93 to 28.13, F=3.17 to 5.25, ω=39.42 to 9.68
The data of the fifth embodiment is presented in Table 13.

TABLE 13

| Surface Number | R | D | $N_d$ | $v_d$ | Remarks | |
|---|---|---|---|---|---|---|
| 01 | 16.264 | 1.00 | 1.74330 | 49.22 | First Lens | First Group |
| 02 | 8.239 | 5.53 | | | | |
| 03* | 531.474 | 1.11 | 1.76800 | 49.20 | Second Lens | |
| 04* | 10.422 | 0.95 | | | | |
| 05 | 21.386 | 2.34 | 1.84666 | 23.78 | Third Lens | |
| 06 | 176.652 | Variable A | | | | |
| 07 | 13.684 | 3.84 | 1.72825 | 28.32 | Fourth Lens | Second Group |
| 08 | 10.022 | 3.05 | 1.48749 | 70.44 | Fifth Lens | |

TABLE 13-continued

| Surface Number | R | D | $N_d$ | $v_d$ | Remarks | |
|---|---|---|---|---|---|---|
| 09 | −99.910 | 0.10 | | | | |
| 10* | 10.623 | 2.63 | 1.58913 | 61.25 | Sixth Lens | |
| 11* | 486.189 | Variable B | | | | |
| 12 | Aperture | 1.50 | | | | |
| 13* | 38.782 | 0.80 | 1.60700 | 27.00 | Seventh Lens | Third Group |
| 14 | 7.096 | 0.60 | | | | |
| 15 | 21.381 | 1.27 | 1.51680 | 64.20 | Eighth Lens | |
| 16 | 45.239 | 0.88 | 1.83500 | 42.98 | Ninth Lens | |
| 17 | 27.954 | Variable C | | | | |
| 18* | 15.797 | 2.67 | 1.51680 | 64.20 | Tenth Lens | Fourth Group |
| 19 | −58.901 | Variable D | | | | |
| 20 | ∞ | 0.93 | 1.54892 | 69.31 | Various Filters | |
| 21 | ∞ | 0.80 | | | | |
| 22 | ∞ | 0.50 | 1.50000 | 64.00 | | |
| 23 | ∞ | | | | | |

[Aspherical Surface]

The data of the aspherical surface is presented in Table 14.

TABLE 14

| Surface Number | K | A4 | A6 | A8 | A10 |
|---|---|---|---|---|---|
| 3 | 0.0 | −6.72007E−06 | −1.10060E−06 | 2.47846E−08 | −1.31155E−10 |
| 4 | 0.0 | −1.96213E−04 | −3.10778E−06 | 5.62150E−08 | −5.91613E−10 |
| 10 | 0.0 | −6.31868E−05 | −1.00231E−06 | −2.51124E−08 | 3.74086E−11 |
| 11 | 0.0 | 1.03949E−05 | −6.97648E−07 | −1.80996E−08 | 1.84576E−10 |
| 13 | 0.0 | −8.53893E−05 | 4.18576E−06 | −5.24830E−07 | 2.62203E−08 |
| 18 | 0.0 | −2.17581E−05 | 2.53704E−07 | −1.16361E−08 | 1.12539E−10 |

[Valuable Amount]

The data of the valuable amount is presented in Table 15.

TABLE 15

| | Short Focus End $f = 5.93$ | Intermediate Focal Length $f = 12.91$ | Long Focus End $f = 28.13$ |
|---|---|---|---|
| A | 35.38 | 11.79 | 1.02 |
| B | 0.98 | 2.27 | 7.25 |
| C | 8.93 | 7.75 | 12.57 |
| D | 3.06 | 12.50 | 27.46 |

[Value of Parameter of Conditions]

Figure 12:
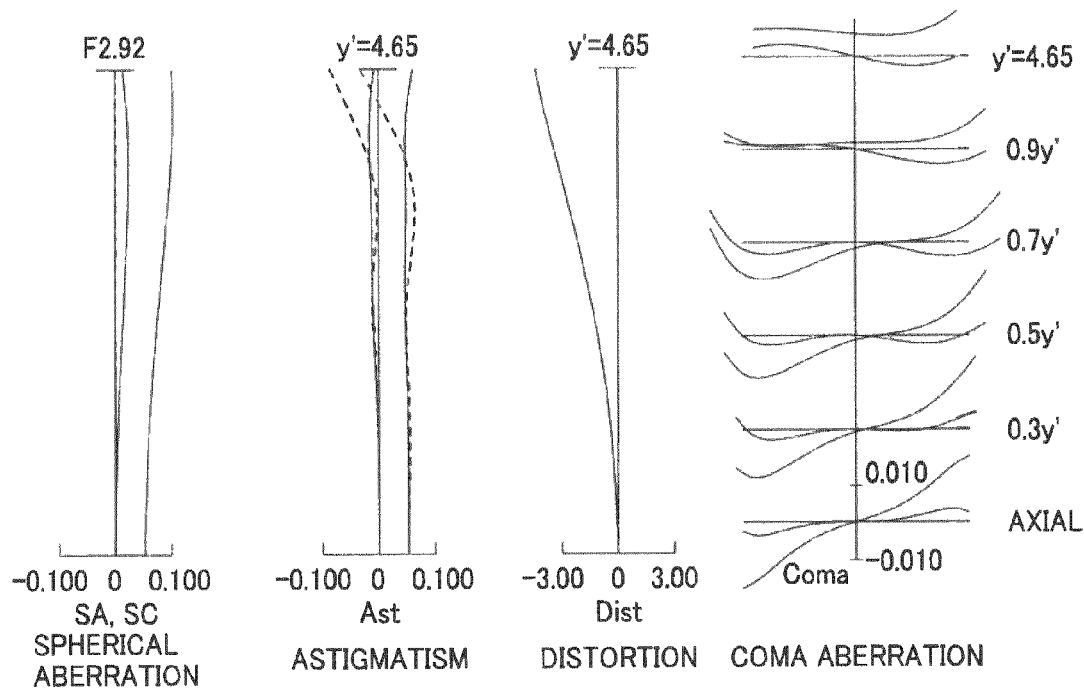
FIG. 12 is a view illustrating aberrations at a short focus end of the zoom lens according to the third embodiment.
Figure 13:
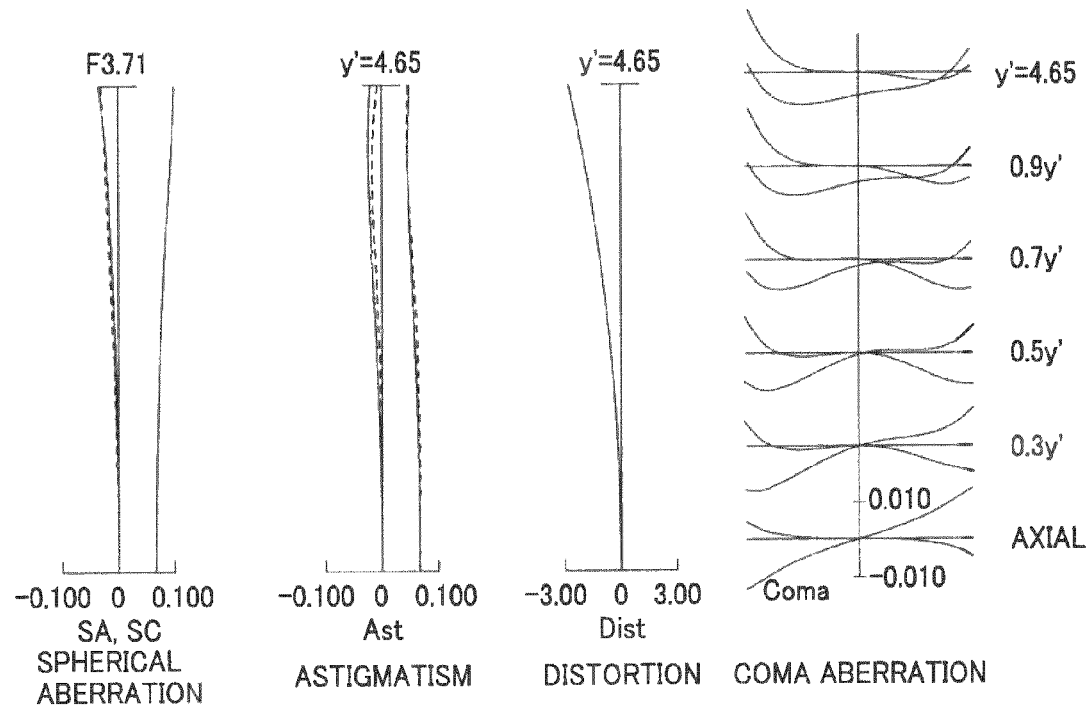
FIG. 13 is a view illustrating aberrations at an intermediate focal length of the zoom lens according to the third embodiment.
Figure 14:
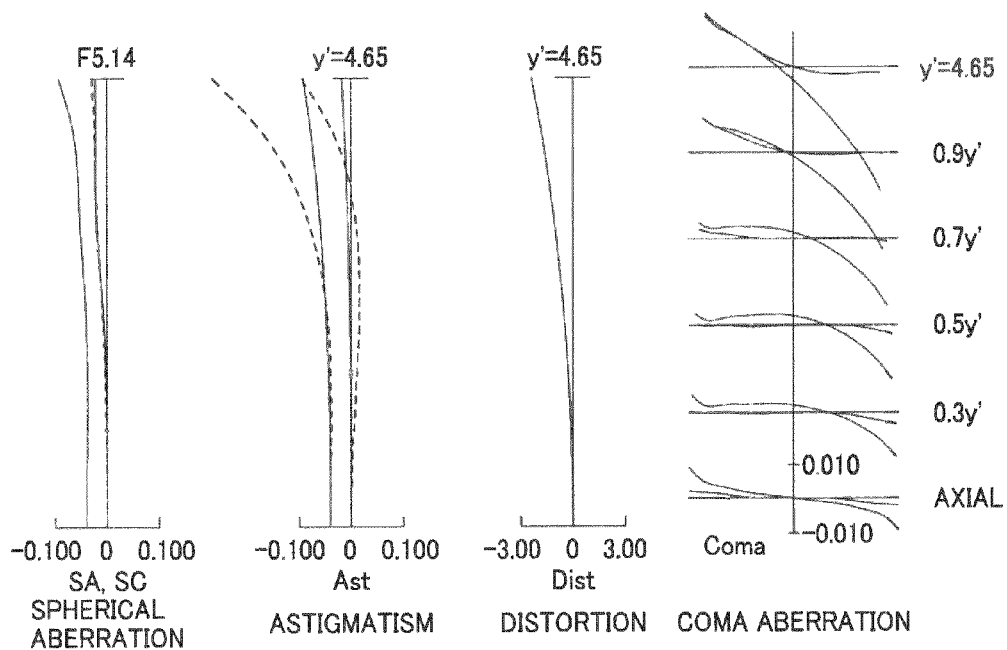
FIG. 14 is a view illustrating aberrations at a long focus end of the zoom lens according to the third embodiment.
Figure 15:
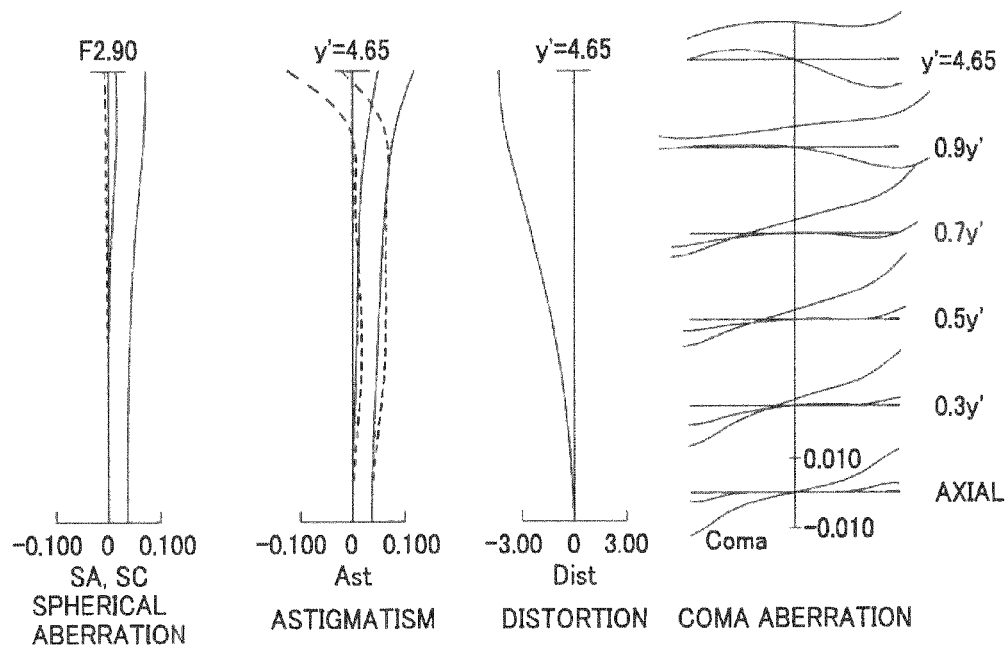
FIG. 15 is a view illustrating aberrations at a short focus end of the zoom lens according to the fourth embodiment.
Figure 16:
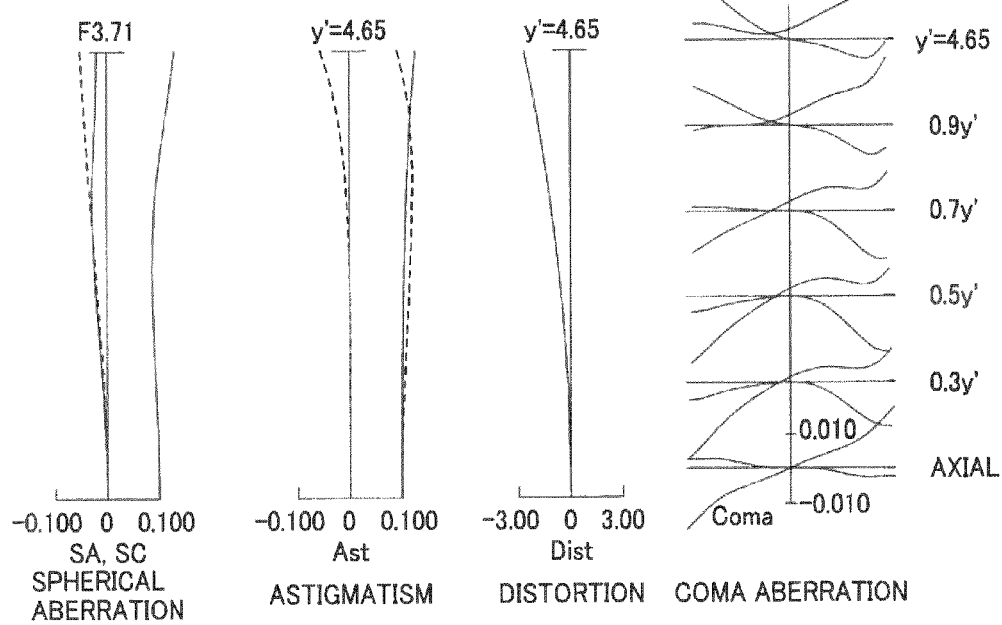
FIG. 16 is a view illustrating aberrations at an intermediate focal length of the zoom lens according to the fourth embodiment.
Figure 17:
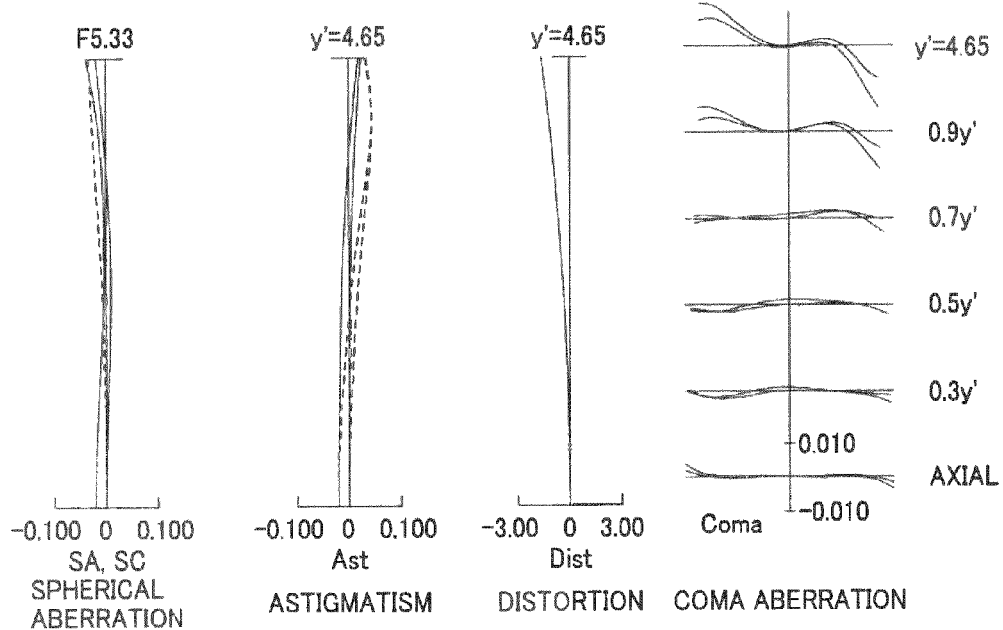
FIG. 17 is a view illustrating aberrations at a long focus end of the zoom lens according to the fourth embodiment.
Figure 18:
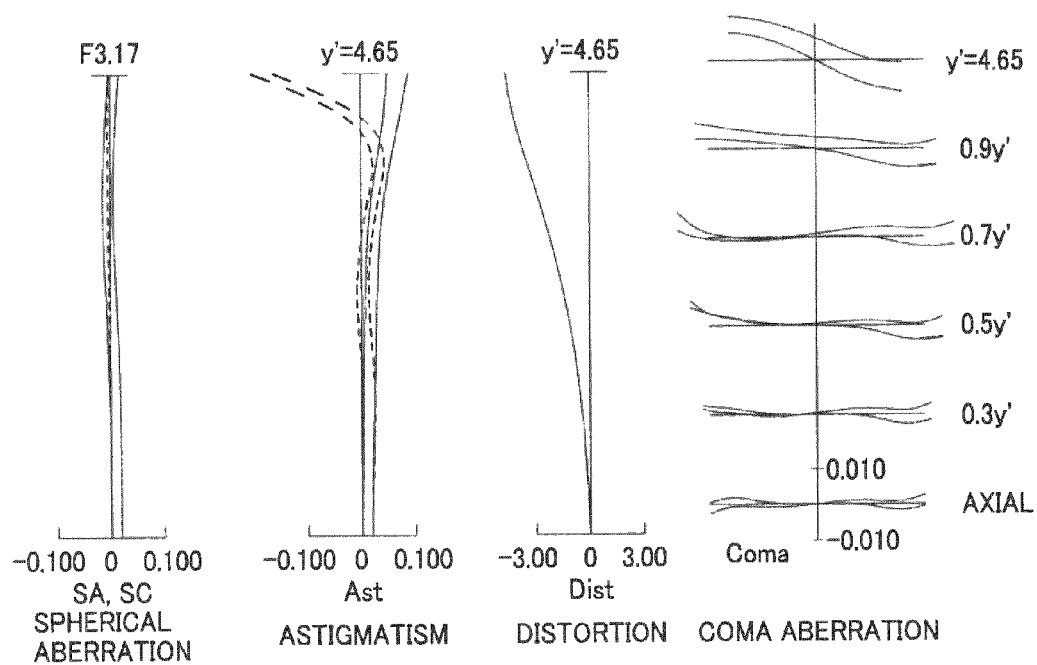
FIG. 18 is a view illustrating aberrations at a short focus end of the zoom lens according to the fifth embodiment.
Figure 19:
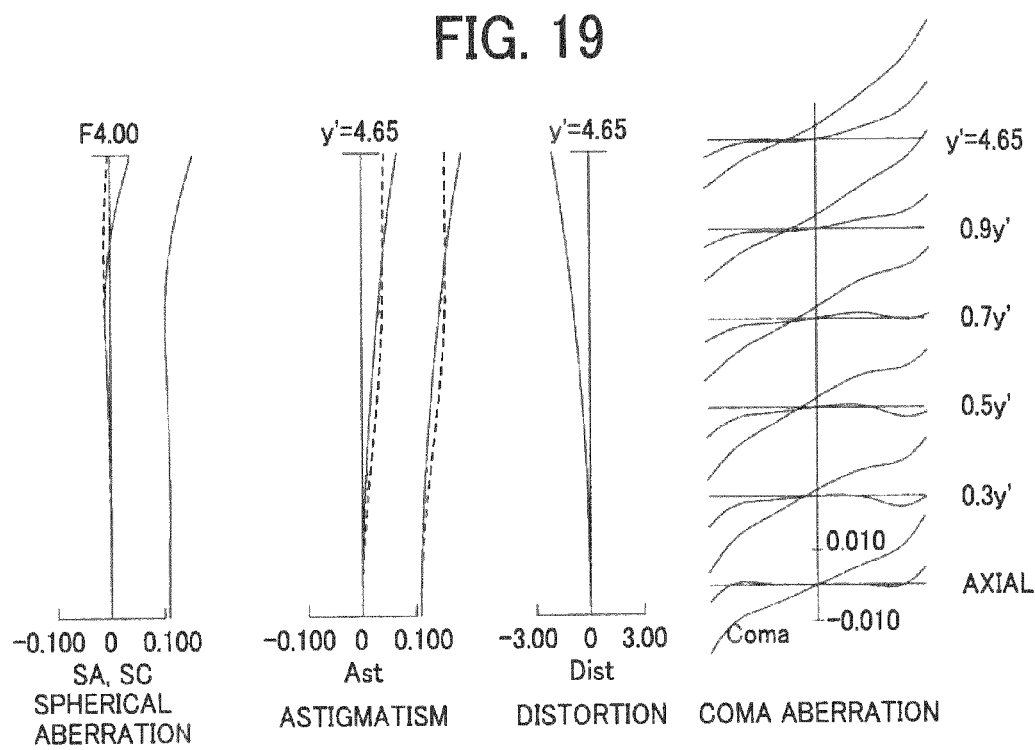
FIG. 19 is a view illustrating aberrations at an intermediate focal length of the zoom lens according to the fifth embodiment.
Figure 20:
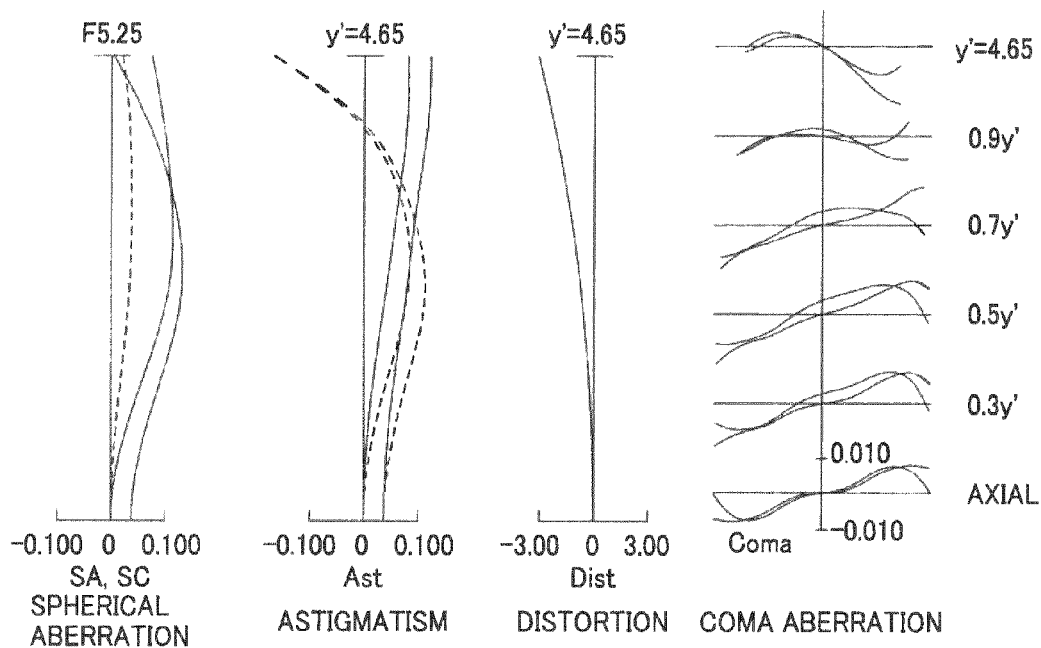
FIG. 20 is a view illustrating aberrations at a long focus end of the zoom lens according to the fifth embodiment.

$|F_1/F_W|=2.00$ $D3_T/D3_W=1.41$ $Fno_T \cdot f_W/Y_{max}=6.70$ $N_{1P}=1.847$ $N_{1N}=1.756$ $v_{1N}-v_{1P}=25.43$ $|R_{C3}/Y_{max}|=9.73$ $|f_4/f_1|=2.06$ FIG. 12, 13, 14 illustrate aberration views at the short focus end, the intermediate focal length, and the long focus end regarding the third embodiment, respectively. FIGS. 15, 16, 17 illustrate aberration views at the short focus end, the intermediate focal length, and the short focus end regarding the fourth embodiment, respectively. FIGS. 18, 19, 20 illustrate aberration views at the short focus end, the intermediate focal length, and the long focus end regarding the fifth embodiment, respectively.

Sixth Embodiment, Refer to FIG. 21 f=5.95 to 28.12, F=2.74 to 4.91, ω=39.25 to 9.58

The data of the sixth embodiment is presented in Table 16

TABLE 16

| Surface Number | R | D | $N_d$ | $v_d$ | Remarks | |
|---|---|---|---|---|---|---|
| 01 | 16.298 | 0.87 | 1.83500 | 42.98 | First Lens | First Group |
| 02 | 8.653 | 5.74 | | | | |
| 03 | −382.684 | 1.25 | 1.77250 | 49.62 | Second Lens | |
| 04* | 10.344 | 0.92 | | | | |
| 05 | 17.171 | 2.68 | 1.84666 | 23.78 | Third Lens | |
| 06 | 88.370 | Variable A | | | | |
| 07* | 15.039 | 3.98 | 1.58410 | 30.45 | Fourth Lens* | Second Group |

TABLE 16-continued

| Surface Number | R | D | $N_d$ | $v_d$ | Remarks | |
|---|---|---|---|---|---|---|
| 08 | 16.561 | 0.10 | | | | |
| 09 | 12.690 | 3.33 | 1.72825 | 28.32 | Fifth Lens | |
| 10 | 8.225 | 3.00 | 1.48749 | 70.44 | Sixth Lens | |
| 11 | −100.000 | 0.10 | | | | |
| 12* | 11.112 | 2.34 | 1.58913 | 61.25 | Seventh Lens | |
| 13 | 232.042 | Variable B | | | | |
| 14 | Aperture | 1.43 | | | | |
| 15* | 119.962 | 0.80 | 1.60700 | 27.00 | Eighth Lens* | Third Group |
| 16 | 8.841 | 5.07 | | | | |
| 17 | 20.313 | 2.99 | 1.51680 | 64.20 | Ninth Lens | |
| 18 | −7.231 | 0.80 | 1.83500 | 42.98 | Tenth Lens | |
| 19 | −30.569 | Variable C | | | | |
| 20 | 17.204 | 0.80 | 1.48749 | 70.44 | Eleventh Lens | Fourth Group |
| 21 | 16.282 | 1.70 | 1.84666 | 23.78 | Twelfth Lens | |
| 22 | 37.624 | Variable D | | | | |
| 23 | ∞ | 0.93 | 1.54892 | 69.31 | Various Filters | |
| 24 | ∞ | 0.80 | | | | |
| 25 | ∞ | 0.50 | 1.50000 | 64.00 | | |
| 26 | ∞ | | | | | |

[Aspherical Surface]
The data of the aspherical surface is presented in Table 17.

[Value of Parameter of Conditions]
$|F_1/F_W|=1.97$

TABLE 17

| Surface Number | K | A4 | A6 | A8 | A10 |
|---|---|---|---|---|---|
| 4 | 0.0 | −1.88884E−04 | −1.03088E−06 | 3.32608E−09 | −1.59670E−10 |
| 7 | 0.0 | −1.21708E−05 | −1.78727E−07 | 1.41217E−09 | −2.28329E−11 |
| 12 | 0.0 | −7.74148E−05 | −3.96958E−07 | −3.30683E−09 | 1.34067E−11 |
| 15 | 0.0 | 7.26549E−05 | 8.09979E−07 | −1.33554E−08 | 1.09318E−09 |

[Valuable Amount]
The data of valuable amount is presented in Table 18.

TABLE 18

| | Short Focus End f = 5.95 | Intermediate Focal Length f = 12.90 | Long Focus End f = 28.12 |
|---|---|---|---|
| A | 32.39 | 11.04 | 1.00 |
| B | 1.00 | 3.18 | 8.19 |
| C | 2.39 | 2.73 | 3.58 |
| D | 3.12 | 7.27 | 22.62 |

$D3_T/D3_W=1.50$
$Fno_T \cdot f_W/Y_{max}=6.28$
$N_{1P}=1.847$
$N_{1N}=1.804$
$v_{1N}-Y_{1P}=22.52$
$|R_{C3}/Y_{max}|=1.56$ Seventh Embodiment, Refer to FIG. 22 f=5.95 to 28.14, F=2.62 to 4.80, ω=39.25 to 9.59

The data of the seventh embodiment is presented in Table 19.

TABLE 19

| Surface Number | R | D | $N_d$ | $v_d$ | Remarks | |
|---|---|---|---|---|---|---|
| 01 | 16.978 | 0.93 | 1.77250 | 49.62 | First Lens | First Group |
| 02 | 8.549 | 5.59 | | | | |
| 03 | 1210.070 | 1.21 | 1.77250 | 49.62 | Second Lens | |
| 04* | 9.994 | 0.80 | | | | |
| 05 | 16.142 | 2.59 | 1.84666 | 23.78 | Third Lens | |
| 06 | 61.279 | Variable A | | | | |
| 07* | 14.226 | 2.03 | 1.58410 | 30.45 | Fourth Lens* | Second Group |
| 08 | 14.545 | 0.10 | | | | |
| 09 | 11.649 | 3.99 | 1.72825 | 28.32 | Fifth Lens | |
| 10 | 7.716 | 3.00 | 1.48749 | 70.44 | Sixth Lens | |

TABLE 19-continued

| Surface Number | R | D | $N_d$ | $v_d$ | Remarks | |
|---|---|---|---|---|---|---|
| 11 | −100.000 | 0.10 | | | | |
| 12* | 9.398 | 2.48 | 1.51680 | 64.20 | Seventh Lens | |
| 13 | 330.010 | Variable B | | | | |
| 14 | Aperture | 1.35 | | | | |
| 15* | 37.327 | 0.80 | 1.60700 | 27.00 | Eighth Lens* | Third Group |
| 16 | 6.977 | 5.32 | | | | |
| 17 | 17.884 | 2.70 | 1.51680 | 64.20 | Ninth Lens | |
| 18 | −10.000 | 0.80 | 1.83500 | 42.98 | Tenth Lens | |
| 19 | −58.098 | Variable C | | | | |
| 20 | 16.582 | 0.80 | 1.48749 | 70.44 | Eleventh Lens | Fourth Group |
| 21 | 17.198 | 1.66 | 1.84666 | 23.78 | Twelfth Lens | |
| 22 | 47.987 | Variable D | | | | |
| 23 | ∞ | 0.93 | 1.54892 | 69.31 | Various Filters | |
| 24 | ∞ | 0.80 | | | | |
| 25 | ∞ | 0.50 | 1.50000 | 64.00 | | |
| 26 | ∞ | | | | | |

[Aspherical Surface]
The data of the aspherical surface is presented in Table 20.

[Value of Parameter of Conditions]
$|F_1/F_W|=1.93$

TABLE 20

| Surface Number | K | A4 | A6 | A8 | A10 |
|---|---|---|---|---|---|
| 4 | 0.0 | −1.92903E−04 | −1.22795E−06 | 3.57951E−09 | −2.02836E−10 |
| 7 | 0.0 | −9.82733E−06 | −2.63596E−07 | 1.21776E−09 | −2.35612E−11 |
| 12 | 0.0 | −1.28128E−04 | −8.59852E−07 | −7.26439E−09 | −7.00848E−11 |
| 15 | 0.0 | 2.18288E−05 | 1.01616E−06 | −9.34034E−08 | 4.76202E−09 |

[Valuable Amount]
The data of the valuable amount is presented in Table 21.

TABLE 21

| | Short Focus End f = 5.95 | Intermediate Focal Length f = 12.90 | Long Focus End f = 28.14 |
|---|---|---|---|
| A | 30.01 | 10.37 | 1.00 |
| B | 1.00 | 2.99 | 7.83 |
| C | 1.43 | 1.98 | 2.16 |
| D | 3.10 | 9.44 | 22.64 |

$D3_T/D3_W=1.51$
$Fno_T \cdot f_W/Y_{max}=6.14$
$N_{1P}=1.847$
$N_{1N}=1.773$
$v_{1B}-v_{1P}=25.84$
$|R_{C3}/Y_{max}|=2.15$ Eighth Embodiment, Refer to FIG. 23 f=5.95 to 28.13, F=2.68 to 4.77, ω=39.28 to 9.65
The data of the eighth embodiment is presented in Table 22.

TABLE 22

| Surface Number | R | D | $N_d$ | $v_d$ | Remarks | |
|---|---|---|---|---|---|---|
| 01 | 24.655 | 1.23 | 1.77250 | 49.62 | First Lens | First Group |
| 02 | 8.692 | 4.76 | | | | |
| 03 | 94.027 | 0.91 | 1.77250 | 49.62 | Second Lens | |
| 04* | 11.086 | 0.80 | | | | |
| 05 | 18.401 | 2.49 | 1.84666 | 23.78 | Third Lens | |
| 06 | 83.897 | Variable A | | | | |
| 07* | 13.676 | 1.77 | 1.58410 | 30.45 | Fourth Lens* | Second Group |
| 08 | 14.333 | 0.10 | | | | |
| 09 | 11.798 | 3.63 | 1.71736 | 29.50 | Fifth Lens | |
| 10 | 7.812 | 3.00 | 1.48749 | 70.44 | Sixth Lens | |
| 11 | −100.000 | 0.10 | | | | |
| 12* | 9.125 | 2.48 | 1.51680 | 64.20 | Seventh Lens | |
| 13 | 278.396 | Variable B | | | | |
| 14 | Aperture | 1.30 | | | | |
| 15* | 30.988 | 0.80 | 1.60700 | 27.00 | Eighth Lens* | Third Group |
| 16 | 6.928 | 4.86 | | | | |

TABLE 22-continued

| Surface Number | R | D | $N_d$ | $v_d$ | Remarks | |
|---|---|---|---|---|---|---|
| 17 | 25.821 | 2.42 | 1.56883 | 56.04 | Ninth Lens | |
| 18 | −10.000 | 0.80 | 1.80420 | 46.50 | Tenth Lens | |
| 19 | −538.663 | Variable C | | | | |
| 20* | 13.910 | 1.88 | 1.81474 | 37.03 | Eleventh Lens | Fourth Group |
| 21 | 43.613 | Variable D | | | | |
| 22 | ∞ | 0.93 | 1.54892 | 69.31 | Various Filters | |
| 23 | ∞ | 0.80 | | | | |
| 24 | ∞ | 0.50 | 1.50000 | 64.00 | | |
| 25 | ∞ | | | | | |

[Aspherical Surface]

The data of the aspherical surface is presented in Tble 23.

TABLE 23

| Surface Number | K<br>K | A4<br>A4 | A6<br>A6 | A8<br>A8 | A10<br>A10 |
|---|---|---|---|---|---|
| 2 | 0.0 | −1.73938E−04 | −8.81884E−07 | 1.98884E−09 | −1.59247E−10 |
| 1 | 0.0 | −1.99614E−06 | −2.64211E−07 | 3.50281E−10 | −1.32147E−11 |
| 12 | 0.0 | −1.51552E−04 | −9.60355E−07 | −1.27345E−08 | −3.87066E−11 |
| 15 | 0.0 | 1.40353E−05 | 1.96738E−08 | −3.24688E−09 | 1.48919E−09 |
| 20 | 0.0 | −2.86301E−05 | −1.40585E−08 | −1.33550E−09 | −2.67395E−11 |

[Valuable Amount]

The data of the valuable amount is presented in Table 24.

TABLE 24

| | Short Focus End<br>f = 5.95 | Intermediate Focal Length<br>f = 13.00 | Long Focus End<br>f = 28.13 |
|---|---|---|---|
| A | 31.62 | 10.67 | 1.00 |
| B | 1.00 | 2.91 | 7.67 |
| C | 2.71 | 2.85 | 4.07 |
| D | 3.10 | 9.91 | 22.73 |

[Value of Parameter of Conditions]

Figure 24:
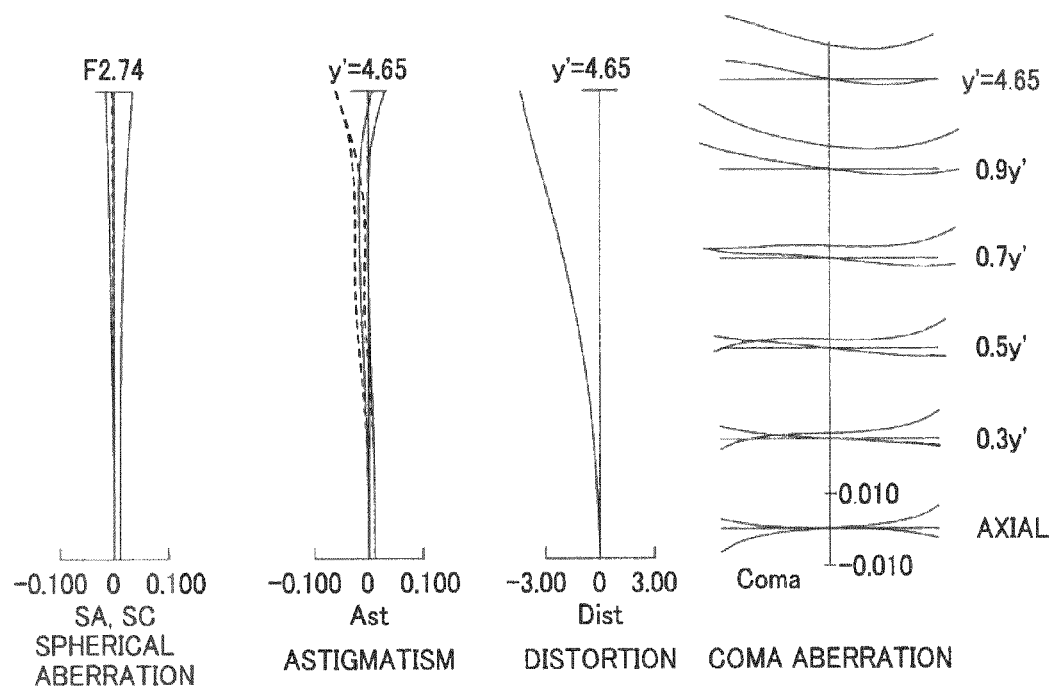
FIG. 24 is a view illustrating aberrations at a short focus end of the zoom lens according to the sixth embodiment.
Figure 25:
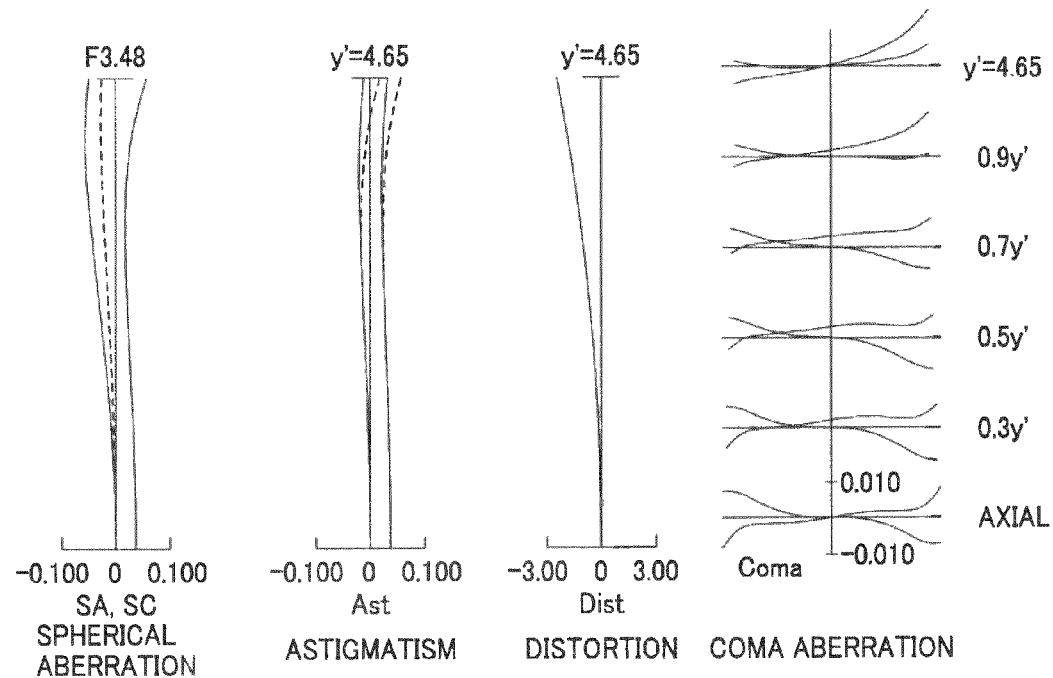
FIG. 25 is a view illustrating aberrations at an intermediate focal length of the zoom lens according to the sixth embodiment.
Figure 26:
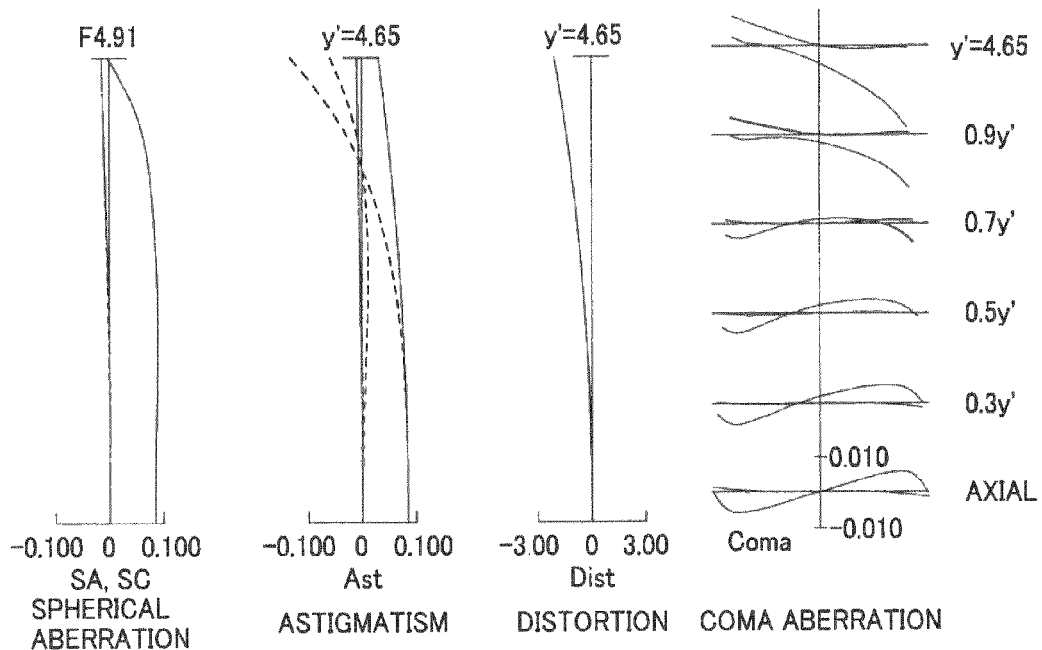
FIG. 26 is a view illustrating aberrations at a long focus end of the zoom lens according to the sixth embodiment.
Figure 27:
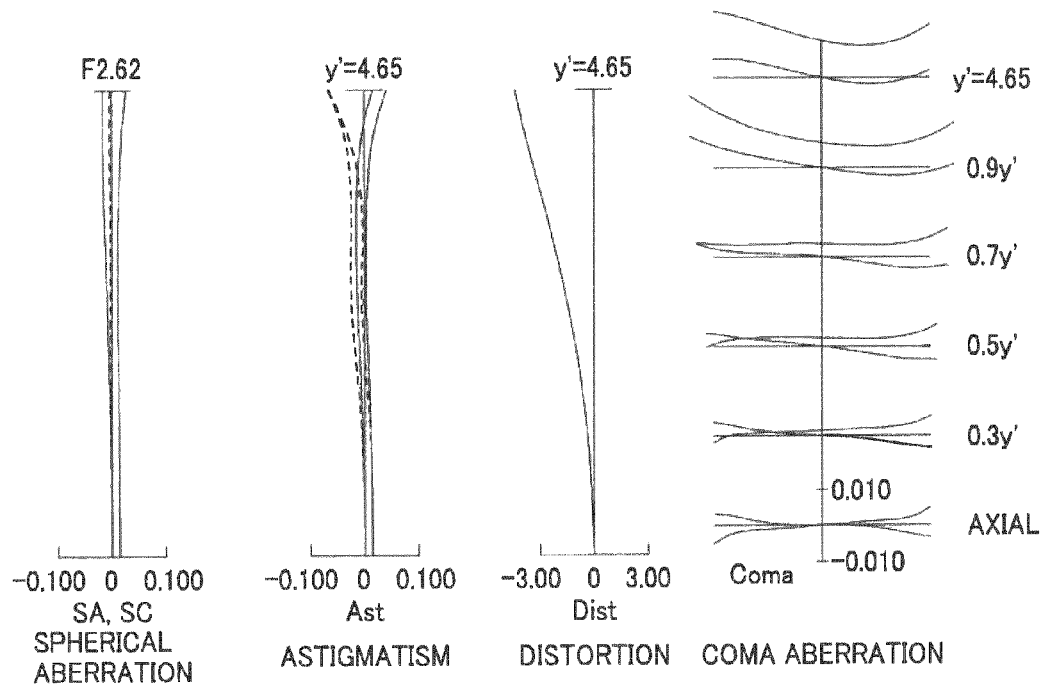
FIG. 27 is a view illustrating aberrations at a short focus end of the zoom lens according to the seventh embodiment.
Figure 28:
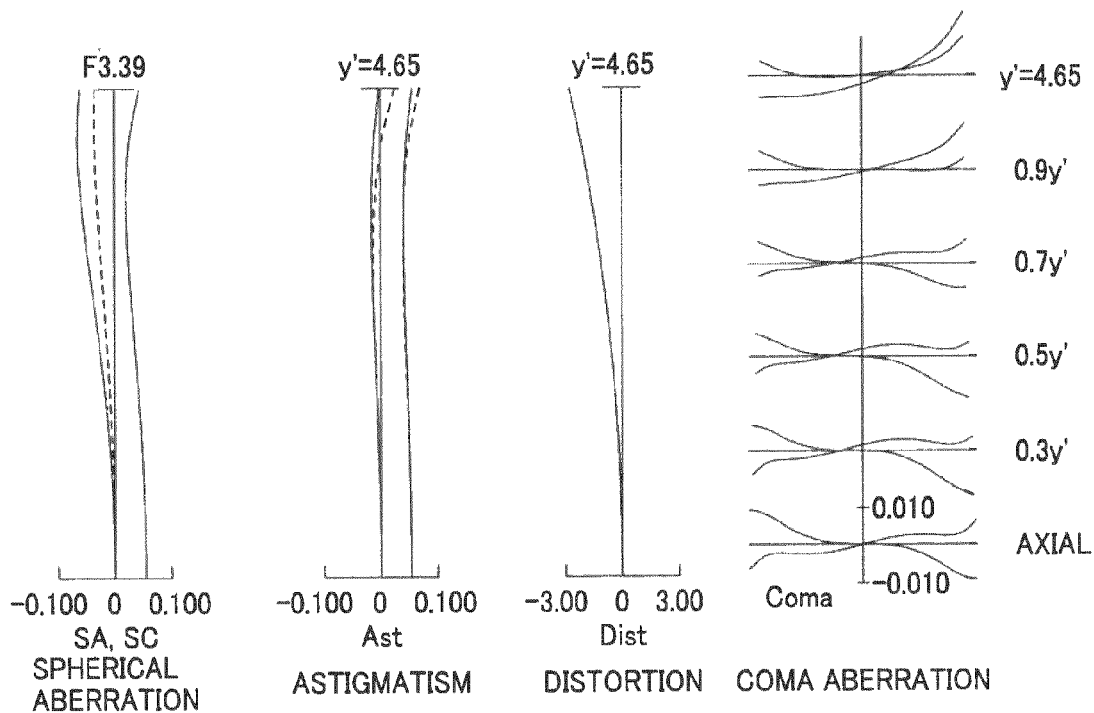
FIG. 28 is a view illustrating aberrations at an intermediate focal length of the zoom lens according to the seventh embodiment.
Figure 29:
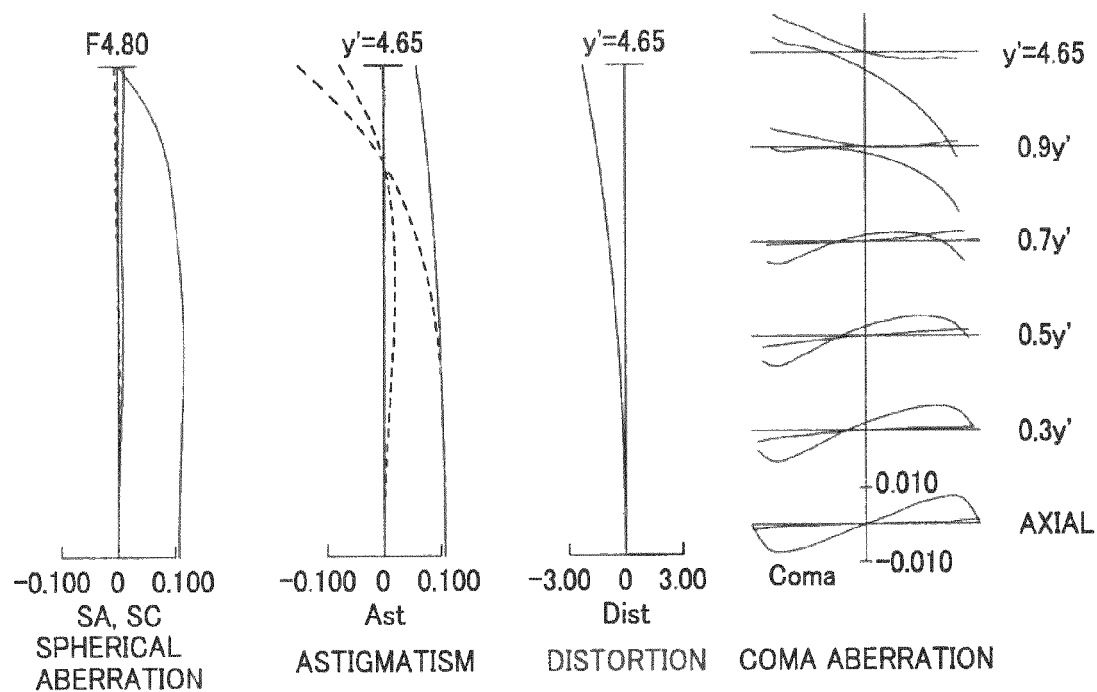
FIG. 29 is a view illustrating aberrations at a long focus end of the zoom lens according to the seventh embodiment.
Figure 30:
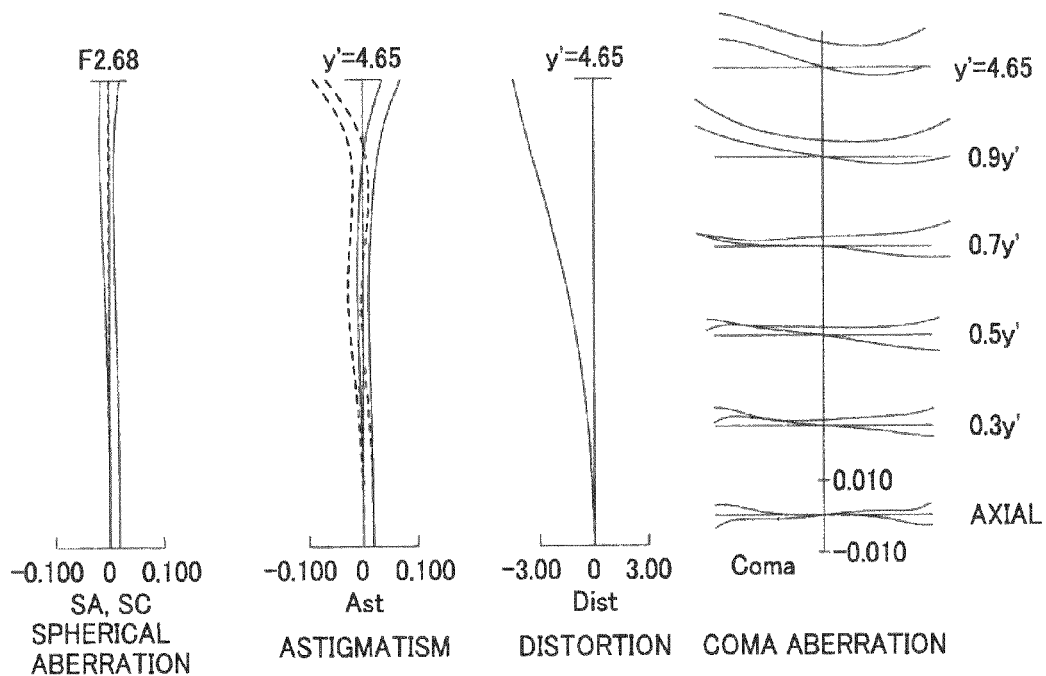
FIG. 30 is a view illustrating aberrations at a short focus end of the zoom lens according to the eighth embodiment.
Figure 31:
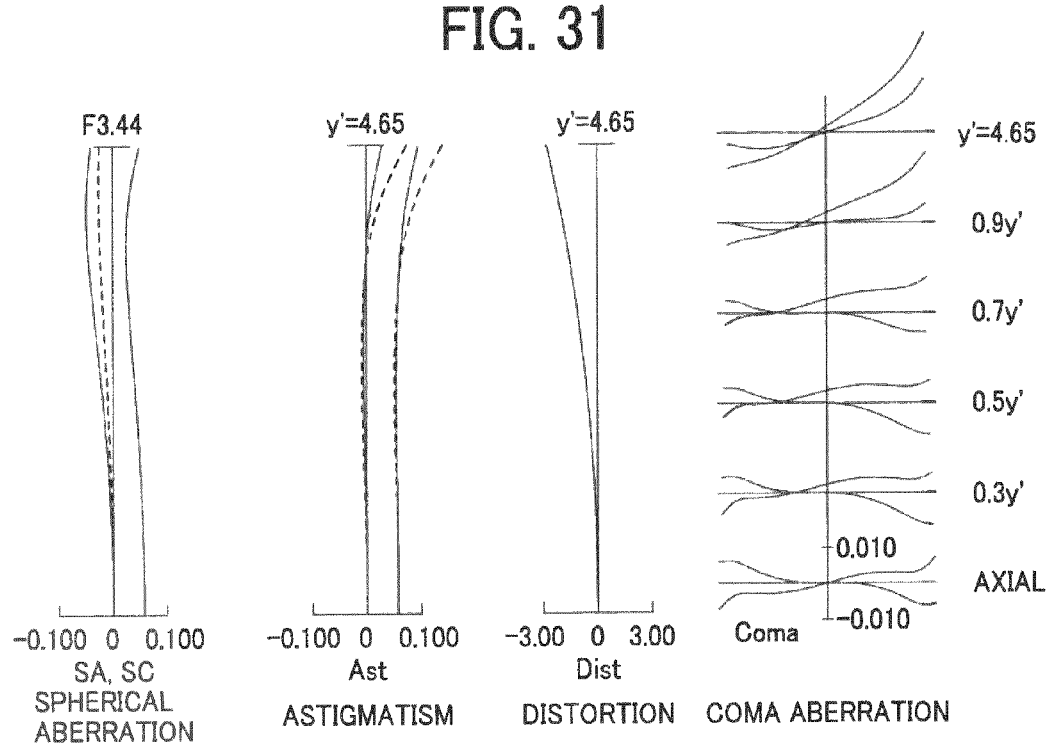
FIG. 31 is a view illustrating aberrations at an intermediate focal length of the zoom lens according to the eighth embodiment.
Figure 32:
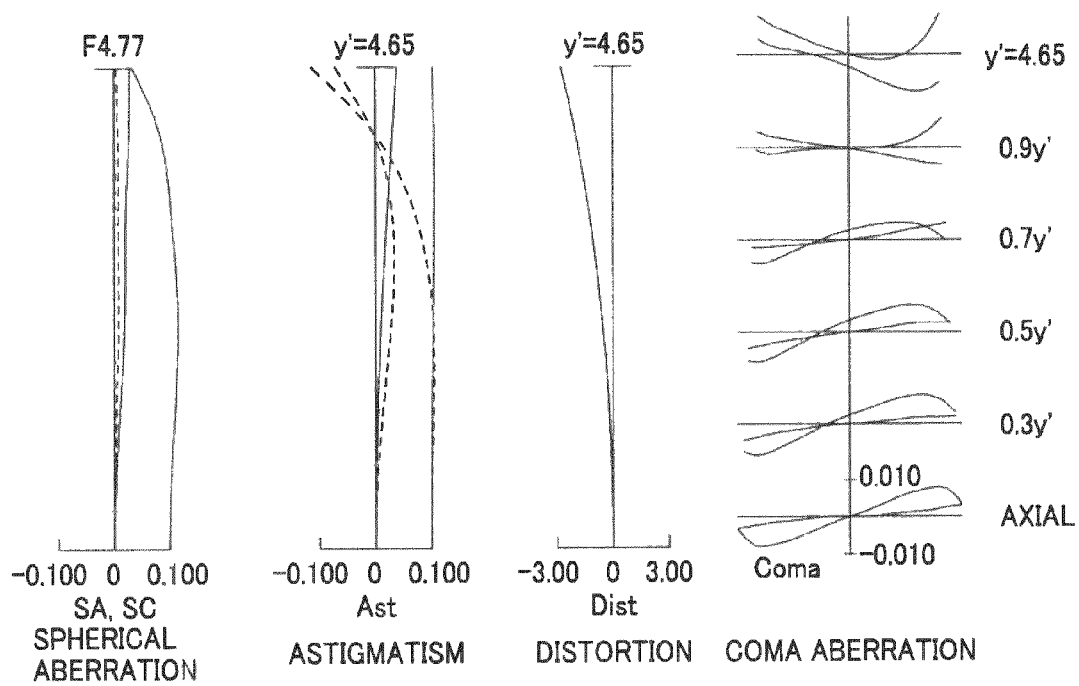
FIG. 32 is a view illustrating aberrations at a long focus end of the zoom lens according to the eighth embodiment.

$|F_1/F_W|=1.97$ $D3_T/D3_W=1.50$ $Fno_T \cdot f_W/Y_{max}=6.11$ $N_{1P}=1.847$ $N_{1N}=1.773$ $v_{1N}-v_{1P}=25.84$ $|R_{C3}/Y_{max}|=2.15$ FIGS. 24, 25, 26 illustrate aberration views at the short focus end, the intermediate focal length, and the long focus end regarding the sixth embodiment, respectively. FIGS. 27, 28, 29 illustrate aberration views at the short focus end, the intermediate focal length, and the long focus end regarding the seventh embodiment, respectively. FIGS. 30, 31, 32 illustrate aberration views at the short focus end, the intermediate focal length, and the long focus end regarding the eighth embodiment, respectively.

As illustrated in each of the aberration views, the aberration is preferably compensated in each of the embodiments, and resolution sufficient to an imaging element having 3 million to 5 million pixels is obtained.

Regarding the number of the lenses, the zoom lens in each of the first, fourth and fifth embodiments has 10 lenses, the zoom lens in each of the second, third and eighth embodiments has 11 lenses and the zoom lens in each of the sixth and seventh embodiments has 12 lenses. Since the zoom lens in each of the embodiments has a small number of the lenses, the zoom lens can be downsized.

Hereinafter, the above-described zoom lens will be further described.

As described above, since the zoom lens for a digital camera is used together with a CCD, a CMOS or the like, an optical limitation with respect to an exit pupil position is more severe than that for a silver salt camera. For this reason, it is necessary for the exit pupil position to be about −20 mm to −100 mm in the whole zooming area.

The zoom lens according to one embodiment of the present invention comprises as a basic structure the three-group structure including the first group having a negative focal length, the second group having a positive focal length and the third group having a negative focal length. In order to reduce the fluctuation in the exit pupil position by a high magnification ratio, the third group in the basic structure is divided into the third group having a negative focal length and the fourth group having a positive group, so as to obtain an appropriate exit pupil position.

In addition, in order to further downsize such a zoom lens, it is necessary to enhance the power of each group. Consequently, it is necessary to perform favorable aberration compensation in the third group near the aperture stop.

In the zoom lens according to one embodiment of the present invention, in order to perform the favorable aberration compensation in the third group near the aperture stop, the third group includes the three-cemented lens having a negative lens, a positive lens and a negative lens. In the two cemented surfaces of the three-cemented lens, distances from the aperture stop are different to each other, and the paths of the light beams of the on-axis and the off-axis are different to each other. By having two such cemented surfaces, the axial chromatic aberration and the chromatic aberration of magnification can be separately compensated in some measure. The two cemented surfaces are especially effective for compensating the chromatic aberration of magnification which increases with a wide angle of view.

As a method of providing two cemented surfaces, a method of using two pairs of cemented lenses can be considered. However, if the two pairs of cemented lenses are used, the optical axes between the cemented lenses may be misaligned by the eccentricity when assembling the cemented lenses. For this reason, the chromatic aberration of magnification which easily causes unnatural color blur is asymmetrically generated in the off-axis. On the other hand, as described in the zoom lens according to one embodiment of the present invention, if the three-cemented lens is used, the assembling eccentricity does not occur onto the two cemented surfaces. Therefore, the chromatic aberration of magnification can be sufficiently reduced.

If the parameter $Fno_T \cdot f_W/Y_{max}$ is smaller than the lower limit of 4.5 of the condition (1), the F-number becomes too small. For this reason, the luminous flux enters into a high position from the optical axis of the second group. Therefore, the aberration increases at the periphery portion, and it becomes difficult to perform preferable aberration compensation. In addition, if the parameter is larger than the upper limit value of 8.5 of the condition (1), the wide angle of view can not be sufficiently obtained, and the F-number becomes too big. For this reason, a sufficient resolving power can not be obtained.

It is preferable for the above parameter $Fno_T \cdot f_W/Y_{max}$ to satisfy the condition (1A) $5.5 < Fno_T \cdot f_W/Y_{max} < 7.0$. By satisfying the condition (1A), the effect which satisfies the condition (1) is encouraged.

The negative proactive zoom type lens is suitable for the wide angle of view; however, when increasing the magnification ratio, the F-number tends to increase at the long focus end. In an interexchangeable lens for a silver salt single-lens reflex camera, the increase in the F-number is reduced by varying the diameter of the aperture stop, so as to obtain the diameter of the aperture stop at the long focus end larger than the diameter of the aperture stop at the short focus end. However, this structure is complex and has a lot of demerits such as the increase in the size of the lens barrel. For this reason, this structure is not used for the zoom lens having a high magnification ratio for a digital camera which especially requires compactness, and especially for the zoom lens having a high magnification ratio of 4 times or more. Considering these factors, it is preferable for the F-number at the long focus end to be $Fno_T < 5.5$.

For conducting further sufficient aberration compensation, in the zoom lens according to one embodiment of the present invention, it is desirable for the negative lens nearest to the image side in the three-cemented lens of the third group to have the meniscus shape having the concave surface on the image side. By providing a convex surface on the object side surface of this negative lens, the incident light beam is not largely reflected. Therefore, the generation of unnecessary aberration is prevented. The spherical aberration and coma aberration can be mainly compensated by providing the strong concave surface on the image side surface.

Moreover, in order to further simplify and improve the zoom lens according to one embodiment of the present invention, it is preferable for the object side surface of the lens nearest to the object side in the third group to have an aspherical surface. Since the surface nearest to the object side in the third group is disposed near the aperture stop, the marginal ray has a sufficient height, and the change in the light beam height by the zooming is small, the spherical aberration which is the basis of an imaging performance can be preferably compensated by providing the aspherical surface in the surface nearest to the object side in the third group.

In addition, since the third group includes the structure consisting of the three-cemented lens, the third group can be effectively downsized.

Moreover, for the preferable chromatic aberration compensation, it is preferable for the third group to satisfy the conditions (2), (3).

If the parameter $N_{C2}$ of the condition (2) is 1.65 or more, and if the parameter $v_{C2}$ of the condition (3) is 50 or less, it becomes difficult to balance the axial chromatic aberration and another aberration, and especially, the axial chromatic aberration at the long focus end is easily generated. In addition, the compensation effect of the monochromatic aberration in the cemented plane on the object side can not be significantly obtained. On the other hand, if the parameter $N_{C2}$ is 1.45 or less and if the parameter $V_{C2}$ is 85 or more, it is advantageous for compensating the aberration, but such a glass material is expensive, resulting in the increase in the costs.

Furthermore, in addition to the conditions (2), (3), it is preferable for the refractive index $N_{C3}$ and the Abbe's number $V_{C3}$ of the negative lens disposed nearest to the image side in the three-cemented lens of the third group to satisfy the following conditions.

$$1.45 < N_{C3} < 1.65 \qquad (4)$$

$$v_{C2} - v_{C3} > 20 \qquad (5)$$

By satisfying the conditions (4), (5) with the conditions (2), (3), the axial chromatic aberration and the chromatic aberration of magnification are balanced, so that, especially, the chromatic aberration of magnification at the short focus end can be reduced, and the compensation state of the monochromatic aberration can be well maintained.

In order to further improve the monochromatic aberration, it is preferable to satisfy the condition (6).

If the parameter $R_{C2}/R_{C4}$ of the condition (6) is 0.85 or more, the spherical aberration at the long focus end is easily increased in the positive direction, causing the deterioration in the contrast of an image. On the other hand, if the parameter $R_{C2}/R_{C4}$ is 0.20 or less, the compensation ability of the astigmatism and the curved field is reduced, causing the deterioration in the flatness of the image plane in the entire changing magnification area.

In the zoom lens according to one embodiment of the present invention, since the peripheral brightness drastically decreases by the wide angle of view according to the cos 4 law, a measure for ensuring the sufficient peripheral brightness is taken.

In the zoom lens according to one embodiment of the present invention, the first group includes, in order from the object side, the negative meniscus lens having the convex surface on the object side, the negative lens, and the positive lens. By using such a first group, a light beam having a large angle of view is reflected, so as to be approximated to a light beam parallel to the optical axis. Accordingly, the decrease in the periphery brightness can be effectively reduced.

Furthermore, if the parameters $F_1/F_W$, $D_{3T}/D_{3W}$ satisfy the conditions (7), (8), respectively, the zoom lens in which the wide angle of view and the downsizing are well balanced can be achieved while maintaining an appropriate exit pupil position. If the parameter $F_1/F_W$ is larger than the upper limit 2.2 of the condition (7), the power of the first group becomes too weak which makes the downsizing difficult. If the parameter $F_1/F_W$ is smaller than the lower limit 1.7 of the condition (7), the power of the first group becomes too strong, which makes preferable aberration compensation difficult. In addition, if the parameter $D_{3T}/D_{3W}$ is smaller than the lower limit 1.3 of the condition (8), the change between the groups at the time of changing a magnification is reduced, and the zoom lens having the four groups is not required. If the parameter $D_{3T}/D_{3W}$ is larger than the upper limit 1.7 of the condition (8), the distance between the third group and the fourth group becomes too long, resulting in a complex zoom lens structure. Accordingly, it becomes difficult to downsize the zoom lens.

In the zoom lens according to one embodiment of the present invention, by providing the negative lens having on the both surfaces thereof aspherical surfaces in the first group, the off-axis aberration remarkably occurring by the wide angle of view can be controlled, a high quality image can be obtained at the wide angle end, a wide angle of view and a high magnification ratio can be achieved, and periphery brightness can be ensured.

In the zoom lens according to one embodiment of the present invention, in order to achieve a further lightweight zoom lens, the negative lens having on the both surfaces thereof the aspherical surfaces for use in the first group can be made of a plastic. In the zoom lens having the maximum half angle of view of about 40 degrees, the maximum effective diameter of the first group is large, and using the plastic aspherical surface lens in the first group contributes to the lightweight zoom lens.

The condition (9) is a condition which can make the zoom lens according to one embodiment of the present invention be a zoom lens suitable for an imaging device having an imaging element of a digital camera, for example.

If the parameter $Fno_T \cdot f_W/Y_{max}$ is smaller than the lower limit value 4.5 of the condition (9), the F-number becomes too small. Since the luminous flux enters a high position from the optical axis of the second group, the aberration increases in the periphery portion, and it becomes difficult to conduct preferable aberration compensation. In addition, if the parameter $Fno_T \cdot f_W/Y_{max}$ is larger than the upper limit value 8.5 of the condition (9), the sufficient wide angle of view can not be obtained, and the F-number becomes too big. Therefore, sufficient resolving power can not be obtained.

In the structure of the zoom lens according to one embodiment of the present invention, it is preferable for the parameter $Fno_T \cdot f_W/Y_{max}$ to satisfy the following condition (9A) instead of the condition (9).

$$5.5 < Fno_T \cdot f_W/Y_{max} < 6.2 \tag{9A}$$

By satisfying the condition (9A), the effect which satisfies the condition (9) is further encouraged.

As described in the zoom lens according to one embodiment of the present invention, the negative proactive type is suitable for a wide angle of view, but it tends to have the F-number which increases at the long focus end when increasing the magnification ratio. In an interexchangeable lens for a silver salt single-lens reflex camera, the increase in the F-number is reduced by varying the diameter of the aperture stop, so as to obtain the diameter of the aperture stop at the long focus end larger than the diameter of the aperture stop at the short focus end. However, this structure is complex and has a lot of demerits such as the increase in the size of the lens barrel. For this reason, this structure is not used for the zoom lens having a high magnification ratio for a digital camera which especially requires compactness, and especially for the zoom lens having a high magnification ratio of 4 times or more. Considering these factors, it is preferable for the F-number at the long focus end to be $Fno_T < 5.5$.

As the zoom lens described in one embodiment of the present invention, in the zoom lens having the four groups, in order to achieve a high quality image, it is preferable to minimize the chromatic aberration in the first group such that the aberration is not increased by the groups after the second group.

As described above, in order to minimize the chromatic aberration in the first group, it is preferable to satisfy the conditions (10) to (12).

If the parameters $N_{1P}$, $N_{1N}$ are the lower limit of 1.74 or less of the conditions (10), (11), respectively, the power of each lens in the first group is reduced, resulting in the increase in the entire length. In addition, if the parameters $N_{1P}$, $N_{1N}$ are the upper limit of 1.95 or more of the conditions (10), (11), respectively, the costs of the zoom lens increase because such a glass material is expensive.

In addition, if the parameter $v_{1N} - v_{1P}$ is the lower limit value of 20 or less of the condition (12), the compensation ability of the chromatic aberration mainly in the off-axis is reduced, resulting in the deterioration in the performance. It is preferable for the parameters $N_{1P}$, $N_{1N}$ to satisfy the following conditions (10A), (11A) instead of the conditions (10), (11).

$$1.80 < N_{1P} < 1.85 \tag{10A}$$

$$1.74 < N_{1N} < 1.85 \tag{11A}$$

Moreover, in order to obtain a simple zoom lens having a high performance, it is preferable for the aperture stop to move integrally with the third group, and it is also preferable for at least the surface nearest to the object side in the third group to have an aspherical surface. Since the surface nearest to the object side in the third group is disposed near the aperture stop, the marginal ray has a sufficient height, and the change in the light beam height by the zooming is small, the spherical aberration which is the basis of the imaging performance can be preferably compensated by providing the aspherical surface on the surface nearest to the object side in the third group.

In order to reduce the deterioration in the performance by the assembling errors of a lens of the zoom lens according to one embodiment of the present invention, it is preferable for the positive lens and the negative lens on the image side thereof in the third group to be cemented. Since the image side surface of the positive lens and the object side surface of the negative lens in the third group have aberration in the directions which cancel out each other, the deterioration in the image performance by the relative eccentricity of these two lenses is large at the short focus end. However, by cementing these two lenses, such deterioration in the image performance can be prevented.

In order to improve the zoom lens according to one embodiment of the present invention, it is preferable for the zoom lens to satisfy the condition (13).

In the zoom lens according to one embodiment of the present invention, if the parameter $R_{C3}/Y_{max}$ is the upper limit value of 3.0 or more, the power of the cemented surface in the third group becomes too small. Therefore sufficient aberration compensation ability can not be obtained. If the parameter is the lower limit value of 1.0 or less, the power of the cemented surface becomes too big. Therefore, it becomes difficult to balance the aberrations, and it also becomes difficult to conduct preferable aberration compensation.

It is preferable for the parameter $R_{C3}/Y_{max}$ to satisfy the condition (13A) instead of the condition (13).

$$1.0 < |R_{C3}/Y_{max}| < 2.0 \tag{13A}$$

By satisfying the condition (13A), the effect which satisfies the condition (13) is further encouraged.

In the zoom lens structure according to one embodiment of the present invention, in order to obtain a simple zoom lens having a higher performance, it is preferable to conduct the focusing by means of the fourth group. Since the effective diameter of the fourth group is smaller than that of the first group or the like, and the lens is lightweight, the focusing mechanism can be simplified.

As described above, when conducting the focusing by means of the fourth group, it is preferable for the zoom lens to satisfy the condition (14).

If the parameter $|f_4/f_1|$ is larger than the upper limit value of 3.0, the power of the fourth group becomes too weak. For this reason, the focusing movement amount increases, and the structure of the lens barrel becomes complex. In addition, if the parameter is smaller than the lower limit value of 1.5, the power of the fourth group becomes too strong. For this reason, the imaging surface fluctuation increases when focusing, and it becomes difficult to conduct preferable aberration compensation.

As in the zoom lens according to one embodiment of the present invention, generally, in the negative proactive zoom type, when changing a magnification from the short focus end to the long focus end, the second group simply moves from the image side to the object side, and the second group mainly has the changing magnification function. In such a zoom lens, in order to improve the downsizing, it is necessary to increase the power of each group, especially, the power of the second group which is the changing magnification group. Therefore, it is necessary to conduct preferable aberration compensation in the second group. A lot of lenses are required for obtaining a high magnification ratio and a wide angle of view. Since the material of the lens is generally a glass, the whole weight of the zoom lens increases in accordance with the increase in the number of the lenses.

In the zoom lens according to one embodiment of the present invention, a plastic aspherical surface lens is used for the second group of the main changing magnification group which requires a lot of lenses. Therefore, the lightweight zoom lens having a high resolving power corresponding to a CCD having 3 million to 5 million pixels while having a sufficient wide angle of view and high magnification ratio can be achieved.

In addition, if the parameters $F_1/F_W$, $D_{3T}/D_{3W}$ satisfy the conditions (15), (16), the zoom lens in which the wide angle of view and the compactness are well balanced can be achieved while maintaining an appropriate exit pupil position.

If the parameter $F_1/F_W$ is larger than the upper limit value of 2.2, the power of the first group becomes too weak. For this reason, it becomes difficult to downsize the zoom lens. In addition, if the parameter is smaller than the lower limit value of 1.7, the power of the first group becomes too strong. For this reason, it becomes difficult to conduct preferable aberration compensation. If the parameter $D_{3T}/D_{3W}$ is smaller than the lower limit value of 1.3, the change in a distance between the groups is reduced at the time of changing a magnification, and it is not necessary to use the zoom lens having four groups. In addition, if the parameter is larger than the upper limit value of 1.7, the distance between the third group and the fourth group becomes too long, resulting in a complex zooming structure.

In order to suit the zoom lens according to one embodiment of the present invention to a zoom lens suitable for an imaging device having an imaging element such as a digital camera, it is preferable for the zoom lens to satisfy the condition (17).

If the parameter $Fno_T \cdot f_W/Y_{max}$ is smaller than the lower limit value of 4.5, the F-number becomes too small. Therefore, the aberration increases in the periphery portion because the luminous flux enters a high position from the optical axis of the second group, and it becomes difficult to perform preferable aberration compensation. If the parameter is larger than the upper limit value of 8.5, a sufficient wide angle of view is not obtained. Therefore, a sufficient resolving power can not be obtained because the F-number becomes too big.

In the zoom lens structure according to one embodiment of the present invention, it is more preferable for the parameter $Fno_T \cdot f_W/Y_{max}$ to satisfy the condition (17A) instead of the condition (17).

$$4.7 < Fno_T f_W/Y_{max} < 5.5 \quad (17A)$$

By satisfying the condition (17A), the effect which satisfies the condition (17) is encouraged.

The negative proactive zoom type lens is suitable for increasing a wide angle of view. However, the F-number tends to increase at the long focus end when increasing a magnification ratio. In the interexchangeable lens for a silver salt single-lens reflex camera, the increase in the F-number is reduced by varying the diameter of the aperture stop, so as to obtain the diameter of the aperture stop at the long focus end larger than the diameter of the aperture stop at the short focus end. However, this structure is complex and has a lot of demerits such as the increase in the size of the lens barrel. For this reason, this structure is not used for the zoom lens having a high magnification ratio for a digital camera which especially requires compactness, and especially for the zoom lens having a high magnification ratio of 4 times or more. Considering these factors, it is preferable for the F-number at the long focus end to be $Fno_T < 5.5$.

A plastic lens is used for the second group of the zoom lens according to one embodiment of the present invention.

The plastic lens is lightweight, and has a lower price and also high freedom of a processing shape compared with the glass lens. However, the plastic lens is weak relative to an environmental fluctuation compared with the glass lens, and also its image plane position easily fluctuates. In the zoom lens according to one embodiment of the present invention, by using plastic aspherical surface lenses for both of the lens having positive power and the lens having negative power, the influence by the environmental fluctuation is balanced, and a sufficient imaging performance can be obtained even if the environmental fluctuation occurs.

As the zoom lens according to one embodiment of the present invention, it is preferable for the lens having positive power and the lens having negative power to use the plastic aspherical surface lenses each made of a material different to each other. By using such lenses, the environmental fluctuation can be further preferably balanced.

It is also preferable to minimize the chromatic aberration in the first group such that the chromatic aberration in the first group does not increase in the lens groups after the second group. In the zoom lens according to one embodiment of the present invention, it is preferable for the zoom lens to satisfy the conditions (18) to (20).

If the parameters $N_{1P}$, $N_{1N}$ are the lower limit value of 1.74 or less, the power of each lens is insufficient. For this reason, the entire length increases. If the parameters are the upper limit value of 1.95 or more, such a glass material is expensive, resulting in the increase in the costs of the zoom lens. If the parameter $v_{1N} - v_{1P}$ is the lower limit value of 20 or less, the compensation ability of the chromatic aberration is insufficient mainly in the off axis, resulting in the decrease in the performance.

It is preferable for the parameters $N_{1P}$, $N_{1N}$ to satisfy the conditions (18A), (19A) instead of the conditions (18), (19).

$$1.80 < N_{1P} < 1.85 \tag{18A}$$

$$1.74 < N_{1N} < 1.85 \tag{19A}$$

By satisfying the conditions (18A), (19A), the effect which satisfies the conditions (18), (19) is encouraged.

In addition, it is preferable for the aperture stop to move integrally with the third group, and it is preferable for at least the surface nearest to the object side in the third group to provide an aspherical surface. Since the surface nearest to the object side in the third group is disposed near the aperture stop, the marginal ray has a sufficient height, and the change in the light beam height by the zooming is small, the spherical aberration which is the basis of the imaging performance can be preferably compensated by providing the aspherical surface on the surface nearest to the object side in the third group.

In order to reduce the deterioration in the performance by the assembling errors of a lens of the zoom lens according to one embodiment of the present invention, it is preferable for the positive lens and the negative lens on the image side thereof in the third group to be cemented. The image side surface of the positive lens and the object side surface of the negative lens in the third group have aberration in the directions which cancel out each other, so the deterioration in the image performance by the relative eccentricity of these two lenses is large at the short focus end. However, by cementing these two lenses, such deterioration in the image performance can be prevented.

In order to further improve the performance of the zoom lens according to one embodiment of the present invention, it is preferable for the zoom lens to satisfy the condition (21).

If the parameter $R_{C3}/Y_{max}$ is the upper limit value of 3.0 or more, the power of the cemented surface becomes too small. Therefore, sufficient aberration compensation ability can not be obtained. If the parameter is the lower limit value of 1.0 or less, the power of the cemented surface becomes too big. Therefore, it becomes difficult to balance the aberration and it becomes also difficult to conduct preferable aberration compensation. In the zoom lens structure according to one embodiment of the present invention, it is preferable for the parameter $R_{C3}/Y_{max}$ to satisfy the condition (21A) instead of the condition (21).

$$1.5 < |R_{C3}/Y_{max}| < 2.5 \tag{21A}$$

By satisfying the condition (21A), the effect which satisfies the condition (21) is encouraged.

In the zoom lens according to one embodiment of the present invention, the focusing can be conducted by means of the fourth group for simplifying the structure and obtaining a higher performance. Since the fourth group has a lens diameter smaller than that in the first group, and a lightweight lens, the focusing structure can be simplified.

As described above, according to the present invention, the downsized and lightweight new zoom lens can be achieved. As described in the embodiments, the zoom lens has the wide angle of view such that the half angle of view at the short focus end is 35 degrees or more, the high magnification ratio is about 4 to 5 times, and the resolving power suitable for the imaging element has 3 to 5 million pixels. The zoom lens also has a high performance for a changing magnification area, and can dispose the exit pupil position to an appropriate position. In addition, the zoom lens has a small number of lenses such as 10 to 12 lenses. Therefore, the camera having the zoom lens as the photographing optical system and the personal digital assistant having the zoom lens as the photographing optical system of the camera functioning part can be downsized and made lightweight, and also can conduct preferable zoom photographing.

Although the present invention has been described in terms of exemplary embodiments, it is not limited thereto. It should be appreciated that variations may be made in the embodiments described by person skilled in the art without departing from the scope of the present invention as defined by the following claims.

What is claimed is:

1. A zoom lens, comprising: in order from an object side to an image side,
   a first group having a negative focal length;
   a second group having a positive focal length;
   a third group having a negative focal length;
   a fourth group having a positive focal length; and
   an aperture stop between the second group and the third group, wherein
   when changing a magnification from a short focus end to a long focus end, at least the second group monotonically moves from the image side to the object side such that a distance between the first group and the second group decreases, and a distance between the second group and the third group increases, and
   the third group includes a three-cemented lens having a negative lens, a positive lens and a negative lens in order from the object side.

2. The zoom lens according to claim 1, wherein an F-number $Fno_T$ at the long focus end, a focal length $f_W$ at the short focus end, a maximum image height $Y_{max}$ satisfy the condition $4.5 < Fno_T \cdot f_W / Y_{max} < 8.0$.

3. The zoom lens according to claim 1, wherein a surface nearest to the object side in the three-cemented lens of the third group includes an aspherical surface.

4. The zoom lens according to claim 1, wherein a reflective index $N_{C2}$ and an Abbe's number $v_{C2}$ of the positive lens disposed in the middle of the three-cemented lens of the third group satisfy the conditions $1.45 < N_{C2} < 1.65$ and $50 < v_{C2} < 85$.

5. The zoom lens according to claim 4, wherein a reflective index $N_{C3}$ and an Abbe's number $v_{C3}$ of the negative lens nearest to the image side in the three-cemented lens of the third group satisfy the conditions $1.45 < N_{C3} < 1.65$ and $v_{C2} - v_{C3} > 20$.

6. The zoom lens according to claim 1, wherein a curvature radius $R_{C2}$ of a cemented surface of the object side in the three-cemented lens of the third group and a curvature radius $R_{C4}$ of a surface nearest to the image side in the three-cemented lens of the third group satisfy the condition $0.20 < (R_{C2}/R_{C4}) < 0.85$.

7. A zoom lens, comprising: in order from an object side to an image side,
   a first group having a negative focal length:
   a second group having a positive focal length:
   a third group having a negative focal length:
   a fourth group having a positive focal length; and
   an aperture stop between the second group and the third group, wherein
   when changing a magnification from a short focus end to a long focus end, a distance between each of the groups is changed such that a distance between the first group and the second group decreases, a distance between the second group and the third group increases, and a distance between the third group and the fourth group increases,
   the first group includes a negative meniscus lens having a convex surface on the object side, a negative lens, and a positive lens in order from the object side, and a focal length $F_1$ of the first group, a focal length $F_w$ of an entire system at the short focus end, a distance $D_{3T}$ between the third group and the fourth group at the long focus end, and a distance $D_{3W}$ between the third group and the fourth group at the short focus end satisfy the conditions $1.7<|F_1/F_W|<2.2$ and $1.3<D_{3T}/D_{3W}<1.7$.

8. The zoom lens according to claim 7, wherein an F-number $Fno_T$ at the long focus end, a focal length $f_W$ at the short focus end, and a maximum image height $Y_{max}$ satisfy the condition $4.5<Fno_T \cdot f_W/Y_{max}<8.0$.

9. The zoom lens according to claim 7, wherein an average value $N_{1P}$ of refractive indexes and an average value $v_{1P}$ of Abbe's numbers in the positive lens of the first group, and an average value $N_{1N}$ of refractive indexes and an average value $v_{1N}$ of Abbe's numbers in the negative lens of the first group satisfy the conditions $1.74<N_{1P}<1.95$, $1.74<N_{1N}<1.95$, and $v_{1N}-v_{1P}>20$.

10. The zoom lens according to claim 7, wherein a curvature radius $R_{C3}$ and a maximum image height $Y_{max}$ of the cemented surface in the cemented lens of the third group satisfy the condition $1.0<|R_{C3}/Y_{max}|<3.0$.

11. The zoom lens according to claim 7, wherein focusing is conducted by the fourth group.

12. The zoom lens according to claim 7, wherein a focal length $f_1$ of the first group and a focal length $f_4$ of the fourth group satisfy the condition $1.5<|f_4/f_1|<3.0$.

13. A zoom lens, comprising: in order from an object side to an image side:
    a first group having a negative focal length;
    a second group having a positive focal length;
    a third group having a negative focal length;
    a fourth group having a positive focal length; and
    an aperture stop between the second group and the third group, wherein
    when changing a magnification from a short focus end to a long focus end, a distance between each of the groups is changed such that a distance between the first group and the second group decreases, a distance between the second group and the third group increases, and a distance between the third group and the fourth group increases,
    the second group includes at least one plastic aspherical surface lens, and
    a focal length $F_1$ of the first group, a focal length $F_W$ of an entire system at the short focus end, a distance $D_{3T}$ between the third group and the fourth group at the long focus end, and a distance $D_{3W}$ between the third group and the fourth group at the short focus end satisfy the conditions $1.7<|F_1/F_W|<2.2$ and $1.3<D_{3T}/D_{3W}<1.7$.

14. The zoom lens according to claim 13, wherein a F-number $Fno_T$ at the long focus end, a focal length $f_W$ at the short focus end, a maximum image height $Y_{max}$ satisfy the condition $4.5<Fno_T \cdot f_W/Y_{max}<8.0$.

15. The zoom lens according to claim 13, further comprising at least one plastic aspherical surface lens having positive power and at least one plastic aspherical surface lens having negative power.

16. The zoom lens according to claim 13, wherein an average value $N_{1P}$ of refractive indexes and an average value $v_{1P}$ of Abbe's numbers in the positive lens of first group, and an average value $N_{1N}$ of refractive indexes and an average value $v_{1N}$ of Abbe's numbers in the negative lens of the first group satisfy the conditions $1.74<N_{1P}<1.95$ and $v_{1N}-v_{1P}>20$.

17. The zoom lens according to claim 13, wherein the third group includes a negative lens, a positive lens and a negative lens in order from the object side, and the positive lens and the negative lens on the image side thereof are cemented.

18. The zoom lens according to claim 17, wherein a curvature radius $R_{C3}$ and a maximum image height $Y_{max}$ of the cemented surface in the cemented lens of the third group satisfy the condition $1.0<|R_{C3}/Y_{max}|<3.0$.

19. A camera device including the zoom lens according to claim 1 as a photographing optical system.

20. A personal digital assistant including the zoom lens according to claim 1 as a photographing optical system of a camera functioning part.

* * * * *